(12) United States Patent
    Baschy

(10) Patent No.: US 9,003,295 B2
(45) Date of Patent: Apr. 7, 2015

(54) USER INTERFACE DRIVEN ACCESS CONTROL SYSTEM AND METHOD

(76) Inventor: Leo Martin Baschy, Copperopolis, CA (US)

( * ) Notice: Subject to any disclaimer, the term of this patent is extended or adjusted under 35 U.S.C. 154(b) by 593 days.

(21) Appl. No.: 10/802,658

(22) Filed: Mar. 17, 2004

(65) Prior Publication Data

US 2004/0239700 A1 Dec. 2, 2004

Related U.S. Application Data

(60) Provisional application No. 60/320,013, filed on Mar. 17, 2003.

(51) Int. Cl.
  *G06F 3/00* (2006.01)
  *G06F 9/44* (2006.01)
  *G06F 21/62* (2013.01)
  *G06F 21/12* (2013.01)

(52) U.S. Cl.
  CPC .............. *G06F 9/4443* (2013.01); *G06F 21/62* (2013.01); *G06F 21/121* (2013.01)

(58) Field of Classification Search
  USPC ......... 715/741, 742, 743, 744, 745, 746, 747, 715/748–781; 726/2, 26, 27, 28, 29, 30; 709/221, 223, 229
  See application file for complete search history.

(56) References Cited

U.S. PATENT DOCUMENTS

| | | | |
|---|---|---|---|
| 5,379,423 A | 1/1995 | Mutoh et al. | |
| 5,550,968 A | 8/1996 | Miller et al. | |
| 5,675,782 A * | 10/1997 | Montague et al. | 726/4 |
| 5,708,780 A | 1/1998 | Levergood et al. | |
| 5,742,759 A | 4/1998 | Nessett et al. | |
| 5,760,917 A | 6/1998 | Sheridan | |
| 5,761,669 A * | 6/1998 | Montague et al. | 707/103 R |
| 5,929,854 A | 7/1999 | Ross | |
| 6,101,480 A | 8/2000 | Conmy et al. | |
| 6,154,741 A | 11/2000 | Feldman | |

(Continued)

FOREIGN PATENT DOCUMENTS

| | | | |
|---|---|---|---|
| JP | 2011186818 A * | 9/2011 | |
| WO | WO/2004/010258 | 1/2004 | |

OTHER PUBLICATIONS

Eswaran Subrahmanian, n-dim group Project LIRE, http://www.ndim.edrc.cmu.edu/papers/lire.htm.

(Continued)

*Primary Examiner* — Linh K Pham

(57) ABSTRACT

Display regions for representations of results of transformations applied to access control settings for a resource appear integrated with a familiar representation of the resource, e.g. word processor, or Web browser. A number of functions modify layout and transformations, and those functions are available for invocation, e.g. through mouse gestures or key combinations. Users are graphically represented by displays comprising photographic likenesses. Groups can be shown as individual users. Giving someone access to a resource can be as easy as dragging that person's likeness. Access log information can be shown together with access control settings. Reviewing the subset of resources available to a user is made easier. Overflow indicators replace scroll bars. Macros effect snapshots of volatile sets of users. Sections within documents can be omitted automatically if a user lacks authorization. Access control settings for one resource can be linked to be dependent on settings for other resources.

15 Claims, 26 Drawing Sheets

(56) References Cited

U.S. PATENT DOCUMENTS

| | | | |
|---|---|---|---|
| 6,185,684 B1 | 2/2001 | Pravetz et al. | |
| 6,202,066 B1* | 3/2001 | Barkley et al. | 707/9 |
| 6,205,476 B1* | 3/2001 | Hayes, Jr. | 709/220 |
| 6,233,618 B1 | 5/2001 | Shannon | |
| 6,393,468 B1 | 5/2002 | McGee | |
| 6,493,731 B1 | 12/2002 | Jones et al. | |
| 6,502,102 B1* | 12/2002 | Haswell et al. | 1/1 |
| 6,523,027 B1* | 2/2003 | Underwood | 1/1 |
| 6,711,687 B1* | 3/2004 | Sekiguchi | 726/23 |
| 6,738,973 B1 | 5/2004 | Rekimoto | |
| 6,768,999 B2 | 7/2004 | Prager et al. | |
| 6,950,943 B1 | 9/2005 | Bacha et al. | |
| 6,990,631 B2 | 1/2006 | Narahara | |
| 7,051,282 B2 | 5/2006 | Marcjan | |
| 7,079,177 B2* | 7/2006 | Okazaki et al. | 348/211.12 |
| 7,089,530 B1* | 8/2006 | Dardinski et al. | 717/105 |
| 7,272,639 B1 | 9/2007 | Levergood et al. | |
| 7,272,815 B1* | 9/2007 | Eldridge et al. | 717/101 |
| 7,287,227 B2 | 10/2007 | Ries et al. | |
| 7,305,624 B1 | 12/2007 | Siegel | |
| 7,437,468 B2 | 10/2008 | Yamamoto et al. | |
| 8,223,134 B1 | 7/2012 | Forstall et al. | |
| 2001/0037379 A1 | 11/2001 | Livnat | |
| 2001/0052003 A1 | 12/2001 | Seki et al. | |
| 2002/0070865 A1 | 6/2002 | Lancos et al. | |
| 2002/0099837 A1* | 7/2002 | Oe et al. | 709/229 |
| 2002/0141639 A1* | 10/2002 | Steinberg | 382/167 |
| 2002/0167538 A1* | 11/2002 | Bhetanabhotla | 345/700 |
| 2002/0184160 A1 | 12/2002 | Tadayon et al. | |
| 2003/0061087 A1 | 3/2003 | Srimuang et al. | |
| 2003/0164856 A1 | 9/2003 | Prager et al. | |
| 2003/0236996 A1 | 12/2003 | Himmel et al. | |
| 2004/0019799 A1 | 1/2004 | Vering et al. | |
| 2004/0054790 A1 | 3/2004 | Himmel et al. | |
| 2004/0103202 A1* | 5/2004 | Hildebrand et al. | 709/229 |
| 2004/0117194 A9* | 6/2004 | Lee et al. | 705/1 |
| 2004/0193606 A1* | 9/2004 | Arai et al. | 707/9 |
| 2004/0267746 A1 | 12/2004 | Marcjan et al. | |
| 2004/0267871 A1 | 12/2004 | Pratley et al. | |
| 2005/0028080 A1 | 2/2005 | Challenger et al. | |
| 2005/0138566 A1 | 6/2005 | Muller et al. | |
| 2005/0211784 A1* | 9/2005 | Justin | 235/492 |
| 2006/0059462 A1* | 3/2006 | Yamamoto | 717/115 |
| 2006/0101341 A1 | 5/2006 | Kelly et al. | |
| 2006/0106802 A1 | 5/2006 | Giblin et al. | |
| 2006/0117382 A1 | 6/2006 | Karabulut | |
| 2006/0155705 A1 | 7/2006 | Kamper et al. | |
| 2006/0292537 A1 | 12/2006 | Nute et al. | |
| 2007/0050362 A1 | 3/2007 | Low et al. | |
| 2007/0058730 A1 | 3/2007 | Bowra et al. | |

OTHER PUBLICATIONS

Unknown, Obiki documentation of The Access Control Tab, http://www.obiki.org/docs/accesscontrol.html.

Johannes Helmig, Windows XP Access control via Security, Dec. 9, 2001, http://www.windowsnetworking.com/articles_tutorials/wxp-pfsec.html.

Microsoft, Use access control to restrict who can use your files, Windows XP Professional, Aug. 24, 2001, http://www.microsoft.com/windowsxp/using/security/learnmore/accesscontrol.mspx.

Ka-Ping Yee, User Interaction Design for Secure Systems.

Tara Whalen et al, User Experiences with Sharing and Access Control, 2006, ACM 1-59593-298-4/06/0004.

Leo Baschy, Researched History of SubEthaEdit Software.

David Nagel interview, Changing Lives Through Technology, ACM Ubiquity, vol. 5, Issue 6, Apr. 7-13, 2004.

Agapow et al, Wikipedia article on Role Based Access Control, Jun. 16, 2011, http://en.wikipedia.org/wiki/Rbac.

Google search for the exact wording or phrase "access-control-discontinuous hyperlink", Jun. 30, 2010.

Google search for the exact wording or phrase "discontinuous hyperlink", Jun. 29, 2010.

Roy A. Ruddle et al, The effects of hyperlinks on navigation in virtual environments, International Journal of Human-Computer Studies, vol. 53, Issue 4, Oct. 2000, pp. 551-581, ISSN:1071-5819.

Unknown, Wikipedia article on Group in computing, Sep. 30, 2012, http://en.wikipedia.org/wiki/Group_%28computing%29.

Unknown, Wikipedia article on Audience, Sep. 30, 2012, http://en.wikipedia.org/wiki/Audience.

David Vronay, Why Google+ is still not working for humans, Apr. 18, 2012, http://dvronay.blogspot.com/2012/04/why-google-is-still-not-working-for.html.

Tim Berners-Lee, Information Management: A Proposal, CERN, Mar. 1989, http://www.w3.org/History/1989/proposal-msw.html.

Unknown, Wikipedia article on Visual Display Unit, Jun. 24, 2012, http://en.wikipedia.org/wiki/Visual_display_unit.

Unknown, Wikipedia article on False Premise, Mar. 16, 2012, http://en.wikipedia.org/wiki/False_premise.

Small Wonders Software, Security Explorer Data Sheet, Mar. 31, 2004.

Quest Software, Inc., Quest Security Explorer Data Sheet, Jul. 27, 1012, http://www.quest.com/Quest_Site_Assets/PDF/Quest-Security-Explorer-Datasheet.pdf.

Quest Software, Inc., Quest Security Explorer Tour, Jul. 27, 1012, http://www.quest.com/security%2Dexplorer/walkthrough/default.html.

Internet Business Corporation Pty Ltd, Verdi CMS—Granular Permissions, Jul. 27, 2012, http://www.verdicms.com/3/36/4/granular_permissions.pm.

Chris Newman, Re: need review for draft-ietf-Idapext-acl-reqts-01.txt, Apr. 14, 1999, http://lists.w3.org/Archives/Public/ietf-discuss/1999Apr/0005.html.

S. Shepler et al, IETF RFC 3010—NFS version 4 Protocol, Dec. 2000.

S. Shepler et al, IETF RFC 3530—Network File System NFS version 4 Protocol, Apr. 2003.

G. Clemm et al, IETF RFC 3744—Web Distributed Authoring and Versioning WebDAV Access Control Protocol, May 2004.

E. Stokes et al, IETF RFC 2820—Access Control Requirements for LDAP, May 2000.

J. Myers, IETF RFC 2086—IMAP4 ACL extension, Jan. 1997.

Craig R. McClanahan, Authentication and Access Control for Web Applications, JavaOne Session #1291, Jun. 2001.

Nataraj Nagaratnam et al, The Security Architecture for Open Grid Services, Jul. 17, 2002.

David Becker, Software makers ready desktop lockdown, Apr. 20, 2004, http://news.cnet.com/2100-1001_3-5194756.html.

Bruce Chizen interview, Getting Reorganization Right: How Bruce Chizen Drove Change and Innovation at Adobe Systems, Knowledge©Wharton, Apr. 21, 2004.

Cutcom Software Inc., SentryFile Brochure, Jul. 28, 2012, http://www.sentryfile.com/download/sf5_brochureAutoCapture.pdf.

Cutcom Software Inc., SentryFile screen shots, Jul. 18, 2006, http://www.sentryfile.com/index.cfm ? index=PRODUCT/SCREEN_SHOTS.

Cutcom Software Inc., SentryFile screen shots, Jan. 24, 2004, http://web.archive.org/web/20040306064540/http://www.sentryfile.com/index.cfm ? index=PRODUCT/SCREEN_SHOTS.

Unknown, Wikipedia article on Health Insurance Portability and Accountability Act, Aug. 3, 2012, http://en.wikipedia.org/wiki/Health_Insurance_Portability_and_Accountability_Act.

Unknown, Wikipedia article on Electronic health record, Aug. 3, 2012, http://en.wikipedia.org/wiki/Electronic_health_record.

Unknown, Wikipedia article on Personal health record, Aug. 3, 2012, http://en.wikipedia.org/wiki/Personal_health_record.

Healthcare Information and Management Systems Society—HIMSS, Defining and Testing EMR Usability, Jun. 2009, http://www.himss.org/content/files/HIMSS_DefiningandTestingEMRUsability.pdf.

Google search for the words "broken hyperlink", May 24, 2013.

Unknown, Webopedia Computer Dictionary entry for "broken hyperlink", May 24, 2013, http://www.webopedia.com/TERM/B/broken_hyperlink.html.

(56) References Cited

OTHER PUBLICATIONS

Unknown, Object Management Group article "Verfying Hyperlinks", May 21, 2012, http://www.omg.org/tutorial/list_broken_hyperlinks.htm.

Microsoft Corporation, So that's how! Great FrontPage features sections 16 and 17, May 24, 2013, http://office.microsoft.com/en-us/training/fix-broken-hyperlinks-RZ006197816.aspx ? section=16.

A. Aimar et al., WebLinker, a tool for managing WWW cross-references, Computer Networks and ISDN Systems 28 1995 99-107, Jan. 1995.

D. Ingham et al., Fixing the Broken-Link problem: the W3Objects approach, Computer Networks and ISDN Systems 28 1996 1255-1268, Jan. 1996.

Brokenlinkcheck.com Website, Fehlermeldungen, Mar. 26, 2004, https://web.archive.org/web/20040326053617/http://brokenlinkcheck.com/.

Unknown, Wikipedia article on Filename, Apr. 30, 2013, http://en.wikipedia.org/wiki/Filename.

Unknown, Wikipedia article on Variable (computer science), May 1, 2013, http://en.wikipedia.org/wiki/Variable_%28computer_science%29.

Unknown, Wikipedia article on Tooltip, May 2, 2013, http://en.wikipedia.org/wiki/Tooltip.

Sri Atluru et al., English Language & Usage Stack Exchange, Jun. 9, 2011, http://english.stackexchange.com/questions/29141/.

Fumblefingers et al., English Language & Usage Stack Exchange, Feb. 26, 2012, http://english.stackexchange.com/questions/59292/.

Barrie England et al., English Language & Usage Stack Exchange, Jan. 23, 2012, http://english.stackexchange.com/questions/55686/.

* cited by examiner

```
regulars_club
by definition
lee anna danny miriam martin
gwater thakler monte chris cwest
todd rolf franz betsy
```

USER INTERFACE DRIVEN ACCESS CONTROL SYSTEM AND METHOD

RELATED APPLICATION

This application claims priority of U.S. Provisional Application Ser. No. 60/320,013, filed Mar. 17, 2003 by Baschy, entitled "User Interface Driven Access Control", the content of which is hereby incorporated by reference as if set forth fully herein.

FIELD OF THE INVENTION

The present invention is a method for improving the ease of use of access control systems employed in computer information storage, retrieval, transmission, and creation.

BACKGROUND OF THE INVENTION

There is a rich body of prior art regarding user interface design, and access control design. Each of those regions, however, has been traditionally treated without regard for the other, and integration of access control into a facile and consistent user interface has not been the focus of development in the prior art. Apart from systems that announce user permissions by alteration of an icon (such as by the addition of a padlock to the icon of a file to indicate that the file itself has a "locked" attribute), the integration of access control into the user interface is largely an afterthought in the prior art.

BRIEF DESCRIPTION OF THE INVENTION

Many who practice the art have become accustomed to designing user interfaces separately from other elements of their systems. The present invention provides a method for making users of information processing systems more productive, in a more secure manner. The present invention provides a graphical user interface which integrates access control concepts directly, rather than requiring a separate system for "permissions" or "user rights" as is common in the prior art.

BRIEF DESCRIPTION OF THE DRAWINGS

FIGS. 35 to 39: Reviewing what another user has access to.

DETAILED DESCRIPTION OF THE INVENTION

Figure 1:
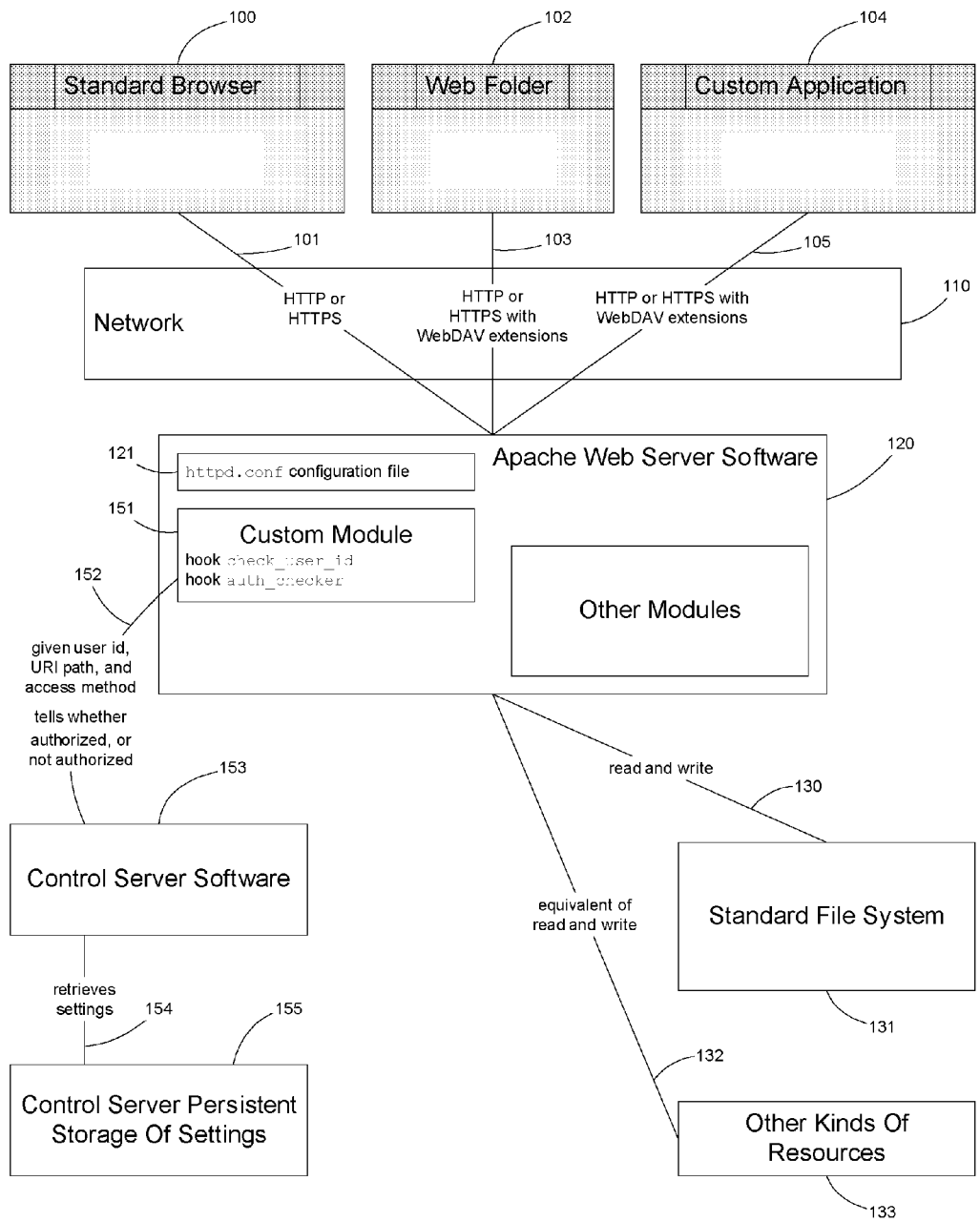
FIG. 1: A module in Apache can control access, but in this implementation the actual decisions are being made in the control server.

For the purpose of clarity of this disclosure, the term "operator" has been used to identify the person who directly interacts with the "user interface", which hence would better be called "operator interface", were it not for the fact that "user interface" is an established term. Because the present invention concerns itself with access control, one "user" or several "users" may be depicted in the user interface, as well as "groups" of users. Users and groups are given access privileges for resources by the operator. The operator himself may also appear in the user interface, as one of a number of users.

Names used in examples herein are intended to be fictional.

The present invention works with, and builds upon systems that give identified, and sometimes unidentified users access to resources, which are defined to include both informational units (files, data streams, etc.) and physical elements of a computing system (devices, channels, storage space, etc.). Resources, as used herein may also be extended to certain physical resources under the control of an information system, such as a sensor, control, or other device. The present invention may be implemented as an enhancement to file servers, databases, operating systems, and other systems.

At the time of this disclosure, the best mode contemplated by the inventor for carrying out the present invention is an implementation as an enhancement to the publicly-available Apache Web server software. It is expected, however, that once the usefulness of the present invention has become apparent to more people, the present invention will be considered in the design of new system architectures. Because of relative complexities of retrofitting into existing architectures, such as Apache, careful balance has been struck in this disclosure in order to provide a clear and concise yet still full and exact description of the present invention. In order to encourage widespread adaptation, neither a specific programming language nor a specific graphical user interface object library are required.

In order to implement the present invention, skills in both user interface engineering and access control engineering are required. In both fields there are practitioners of greatly varying levels of skill and experience. As an example, in user interface engineering there are those who solely have used user interface libraries and claim to have user interface engineering experience, and then there are those who have designed the libraries used by hundreds of thousands of others, e.g. Java Swing, or who have authored leading edge drawing software, e.g. Macromedia Freehand. As another example, in access control engineering there are many who have configured servers, while there are fewer who have designed actual executing code, e.g. mod_ssl, or who have authored leading edge security software, e.g. PGP. The quality of an implementation will greatly depend on the skill and experience of those who engineer it. Other skills that might be considered distinct and helpful include experience in network protocols, markup language, and general system architecture.

According to the theory and practice of the present invention, "looks do matter." In order to achieve the highest rates of correct decisions by operators in the shortest possible time with least effort, what the operator sees is of critical importance. Beyond a certain point, quantitative differences in visual appearance become qualitative differences. By analogy: If the font size of text is below a certain size, e.g. below four, then no one can read at all; if the font size is above a certain number, e.g. above thirty, then most users can read even if they didn't bring their glasses and would need glasses for regular sized text, e.g. for size ten. A quantitative difference in font size effects a difference in whether users can read at all, i.e. a qualitative difference.

According to the theory and practice of the present invention, there are practical limits to the amount of abstract reasoning that should be demanded of a user of a system. These limits may be different from person to person; the limits may be different for a one-time effort and for repeated performance. According to the theory and practice of the present invention one can achieve much higher rates of correct decisions by operators by relieving them of the need to perform complex symbolic mental operations.

The present invention displays both the definition of access control settings as well as effects of access control settings. As an example, if settings for a resource have been made for user "Lee" to be allowed to write, user "Rolf" and group "Marketing" to be allowed to read, then the operator might try to remember who is in Marketing. According to the present invention, the operator may automatically display all individuals including those in the Marketing group: i.e., Lee, Rolf, and users Hank, Thomas, and Christoph.

It must be remembered that a system may be made less useful by the display of additional information. A system designer must consider people's ability to comprehend displays of information. One must consider the limits of display space, as dictated by the limits of screen sizes. If trying to achieve virtual ubiquity, then the limits of display space must be a fraction of the screen size.

The present invention incorporates methods to balance the amount of information with the amount of display space available. The present invention organizes information display in ways that are optimal for achieving the highest rates of correct decisions by operators. The present invention includes, in addition, alternate display region layouts for different tasks. It should also be understood that multidimensional regions may be used interchangeably with two-dimensional regions in display systems that permit representations or simulations of such regions, and that in referring to a "region" of a display herein, the term "region" may be employed without departing from the spirit of the present invention.

Implementations of the present invention may require one of skill in the art to be familiar with a number of software platforms, architectures, programming languages, standards, and specifications. At the time of this writing, extending Apache effectively requires C, actual user interface objects might best be written in Java, using and extending Java Swing, graphics operations might best be performed using libraries such as Java 2D Graphics, or Batik, modules may best communicate with each other with API calls, or over TCP/IP streams, wherein the data which is exchanged might best be encoded using XML, and access control settings might best be stored using LDAP, or Berkeley DB. HTTP, a protocol, might be used plain, or over Secure Sockets Layer (SSL) or Transport Layer Security (TLS) protocols, aka HTTPS. WebDAV extensions to HTTP should be used or supported. Further known elements of software architecture that may make a difference in performance, reliability, and scalability include memory management, and concurrency management, and those are within the skill of those in the art to identify and implement.

This disclosure relies greatly on descriptions of graphical user elements, including descriptions of layouts of graphical user elements, of constraints of layouts, of changes in layouts in reaction to operator action, and of changes in layouts in reaction to other events, in terms familiar to those skilled in the art. The terms used have been chosen so that one skilled in the art, familiar with at least one user interface object platform, can with relative ease make graphical user elements of that platform behave as described.

Because of the different ways user interfaces have been and may be implemented, if the goal is to achieve a constraint then for the purpose of this disclosure it is best to describe the constraint rather than to describe instructions how to enforce the constraint (e.g. if two elements, one above the other, together are to keep a constant vertical dimension, then there are many different ways how code could be written that ensures that together they keep a constant height). By way of further illustration: If one element changes height it could send a message to the other, and vice versa. But, would it do so before or after changing its own height? Which element would perform the calculation to determine the height for the other element, the one initially changing, or the other element itself, or a supervising object? Would there be a short moment in which the total height actually would not equal the desired constant value? If so, then is that moment protected against concurrent access by another process thread? Could that momentary situation possibly flicker onto the screen? For the purpose of clarity of this disclosure it is better to simply state that the two elements are constrained together to a constant height. One skilled in the art can implement necessary constraint code to be compatible with, and making good use of what is available already in the user interface object platform that is being employed.

Another example for the duality of description and instruction are found in contemporary user interface design environments, e.g. Borland JBuilder 8 or NetBeans 3.4. With a few clicks of the mouse button, one can switch among three different ways of setting the size of a user interface element: (1a) One can drag the lower right corner of a representation of the user interface element, (1b) one can type width and height into a table of properties of the user interface element, or (2) one can directly edit an instruction in source code, most of which is being generated automatically, where a line reads something like "setSize(500,300)". One skilled in the art is accustomed to translating between (1) descriptions, e.g. as given in this disclosure, and (2) instructions necessary for a specific user interface object platform.

Interfacing with Apache Web Server Software

Despite the promises of, and possibilities opened by designing completely new system architectures, at the time of this writing, interfacing with Apache Web server software is the inventor's preferred embodiment.

Nevertheless, while specific techniques for interfacing with Apache are disclosed herein, these techniques are not essential to implementing the present invention.

One aspect of improving ease of use is to employ an underlying model of access control that better lends itself to user comprehension. To implement a new underlying model of access control with Apache Web server software one may implement a custom Apache module which makes use of Apache hooks check_user_id and auth_checker. A "hook" is an optional invocation through a pointer in a data structure, a technique used in coding close to the machine level, often to allow future extension of code through modules by other parties, here used as prescribed by the Apache Web server source code and its architecture. Hook check_user_id checks user identity, i.e. whether the user is authentic, whether the user can prove to be who the user id represents, e.g. by verifying whether the user knows a secret password. Hook auth_checker checks access rights, whether the user is authorized to access the resource.

Source code of prior art modules that check access rights is available with Apache open source distributions. Examples are mod_auth, mod_auth_digest, and mod_auth_dbm. Additional understanding of such modules can be gained from reading documentation for directives that are used in the configuration of access rights, which include Require, AccessFileName, AllowOverride, <Limit>, <LimitExcept>, AuthName, AuthType, optionally AuthUserFile, AuthGroupFile, also Satisfy, and AuthAuthoritative, and also Allow, Deny, and Order, and also from documentation regarding per-directory .htaccess configuration files.

FIG. 1 shows where the custom Apache module 151 is located in order to create a point of control for all access 101, 103, 105, 110, 130, 132 from client software 100, 102, 104 to resources 131, 133 which are managed by the Apache Web server software 120, which must have been configured 121 properly.

From the custom Apache module 151 one can implement a connection 152 to control server software 153. The control server could be on the same CPU or on a different physical or virtual machine. The control server could retrieve 154 access control settings from persistent storage 155, e.g. a database, using a library like Berkeley DB, using a library like OpenLDAP, or using custom B-tree code, possibly inside the same file system as the documents served by the Web server.

The present invention differs in one respect from prior art modules in that it locates the decision whether the user is authorized to access the resource, i.e. the decision of hook auth_checker, in the control server. Prior art modules locate the decision of hook check_user_id with the help of database files or servers, but then in their own code use rather simple logic to interpret Require directives from httpd.conf and from .htaccess files. This difference facilitates implementation of alternative models of access control.

This difference is helpful in the development of the present invention, but it is not the essence of the present invention. It is not mandatory for an embodiment of the present invention to have the custom Apache module connect to a distinct control server. Instead, necessary logic could be coded into the module itself.

To further illustrate the distinction or relative independence between (1) the logic of the model, (2) the packaging or location of the code which is used to operate according to the model, and (3) the permanent or even temporary storage of control settings data according to the model, one should consider that as another option, advantageous or not, one could implement a control server that reaches back into the very file system which is being served by the Apache Web server software, and within the directories in that system works with data in .htaccess files.

The custom Apache module when invoked via hooks check_user_id and auth_checker receives as parameter a pointer to to a structure request_rec. From that request_rec, either through following pointers through members in structures, or through function calls, a number of important facts about the request can be retrieved. Those facts include the user id, the URI path, and the HTTP method of the request.

For a simpler model of access control, one should map the larger number of HTTP methods to a smaller number of access methods. One possible mapping is down to two: READ and WRITE, with GET, HEAD, and POST mapped to READ, all other HTTP methods mapped to WRITE, including PUT, and DELETE. The reasoning behind this example mapping has to do with actual use of HTTP methods, specifically common use of POST for queries and use of HTTP methods by WebDAV, rather than what would come to mind when reading RFC 2616.

The present invention further differs from prior art modules, which follow the sequence of Apache Web server hooks, by first checking access rights, and then checking identity. If anonymous access is permitted for the resource, then checking identity may be skipped, since then no error condition exists because checking identity may have failed, and then logging should not record a user identity. To ease implementation, the custom Apache module for each request may store information of its choice between the earlier invocation of hook check_user_id and the later invocation of hook auth_checker. As an auxiliary measure, the custom Apache module should enforce use of a single dummy directive line "Require valid-user", and an error message should point out and prevent any occurrence of a Require directive which lists users or groups. These differences are helpful in the development of the present invention, but they are not essential to the present invention.

Further differing from prior art modules, the custom Apache module should preferably require itself to be configured in a context of server config, or virtual host, and it should raise an error if it finds an attempt to configure it in a context of directory, or .htaccess. Further differing from prior art modules, the custom Apache module should raise an error if it finds an attempt to configure it together with directive Satisfy any. These differences are helpful for better overall security through less unintended effects in configuration files, but they are not essential to the present invention.

The custom Apache module may or may not use techniques equivalent or similar to prior art modules for checking user identity. Nevertheless, the function implemented for hook check_user_id still should be coded specifically for the custom Apache module in order to perform additional tasks.

The code in the custom Apache module which checks access rights may actually be invoked inside the function implemented for hook check_user_id, in order to avoid checking user identity in case of anonymous access being permitted for the resource, while much of the handling of the result of checking access rights would be done inside the function implemented for hook auth_checker.

The custom Apache module when processing a request, i.e. when invoked via hooks check_user_id and auth_checker, when communicating with the control server should pass to the control server as parameters (1) the user id, (2) the URI path, and (3) the access method. The result determined by the control server should tell either (1) that the user is authorized to access the resource with the requested access method, (2) that the user is not authorized to access the resource with the requested access method, or (3) that anonymous access is permitted for the resource for the requested access method.

Figure 2:
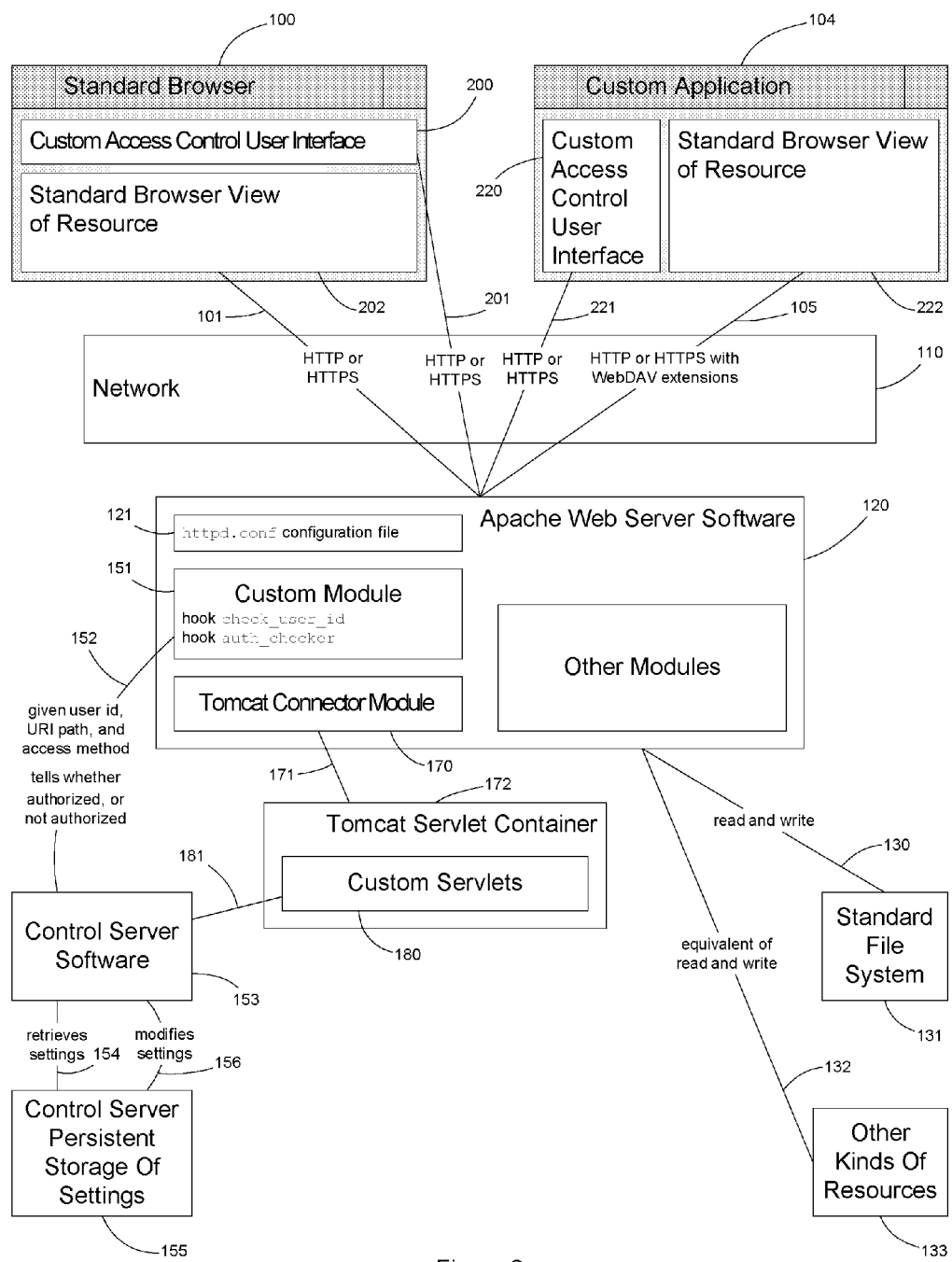
FIG. 2: Connecting the client user interface through Apache to the control server.

While FIG. 1 concerns itself with access control as it occurs when users try to access resources, FIG. 2 concerns itself with how access control settings can be controlled by an operator, who has to be a privileged user, e.g. a user who has authored a document would use the mechanisms of FIG. 2 to give access privileges to the intended audience, e.g. several individuals, other users. Subsequently, those users would use the mechanisms of FIG. 1 to read the document, although some, or all of them may have access to the mechanisms of FIG. 2, depending on whether they are privileged enough themselves.

While FIG. 1 deals with the question: "May user access resource?", FIG. 2 deals with the question: "How does operator set which users may access resource?"

Referring now to FIG. 2 the operator, using either client software 100, or 104, is presented with additional display region 200, or 220. Standard browser components 202, 222, as in FIG. 1, access 101, 105, 110, 130, 132 resources 131, 133 via the Apache Web server software 120, under control of the custom Apache module 151. Additionally, user interface components 200, 220 need to communicate with the control server 153 as well.

FIG. 2 shows user interface components 200, 220 communicating over HTTP, or HTTPS connections 201, 221, 110 with the Web server 120. The Web server must have been configured 121 properly to dispatch 170, 171, 172 those communications to custom servlets 180 which further communicate 181 with control server software 153, which can retrieve 154 and modify 156 access control settings from and in persistent storage 155.

It will be appreciated by one skilled in the art that with (1) user interface components 200, and 220, (2) custom servlets 180, (3) control server software 153, and (4) control server persistent storage 155 there are already at least four separate, albeit connected or related, pieces of code among which one can choose where to implement algorithms for user interface for access control. In practice, decisions have been based on circumstances including licensing conditions, software and hardware pricing, access to source code, availability of tools, and last not least staff skills. Other considerations should include expected usage patterns, hence relative frequency and nature of distinct operations, expected size of control settings data, individually and collectively, estimated numbers of entries, expected bandwidth usage, available bandwidth, encryption requirements, processor usage, and size of memory based caches.

What has been described in this section should be considered necessary technicalities for the purpose of connecting essential innovative elements of the present invention into the Apache Web server architecture. Connections into other architectures depend on technical details of the specifications and implementations of those architectures. Retrofitting into existing architectures in general requires more development effort than is required for fitting into an architecture that is newly being designed under consideration of the present invention.

Underlying Model

One aspect of improving ease of use is to employ an underlying model of access control that better lends itself to comprehension.

Once interfaces to existing systems, e.g. Apache Web server software, have been defined, implemented, or established, there are still a plurality of choices for almost any aspect of implementing the present invention, including programming languages, communication channels between modules, encoding of data, storage of data, libraries for GUI, and libraries for graphics. The descriptions which follow here, therefore, use terms and concepts that should reasonably well fit with more than one of those options. As an example, a structure made of members could be a struct in memory in C++, it could be an object in Java, it could be a node in an XML document, it could be an entry in an LDAP directory, or it could be a record in a database. Those implementing the present invention should be familiar with converting among such modes of storage, description, or encoding, as needed. Examples of conversion include: HTTPS to HTTP by proxy directive, XML elements to DOM objects by parsing, and almost anything to almost anything else by code in a Java servlet.

As disclosed herein, the present invention concerns itself with techniques for when given (1) a user id, (2) a URI path, and (3) an access method then making the decision whether access is (1) authorized, is (2) not authorized, or is (3) permitted to be anonymous. It might be easier to gain understanding of the present invention by first ignoring the anonymous option, and focusing on whether authorized, or not authorized.

The present invention uses structured data to define access control settings for a resource. It conveys information in the form of visual elements, such as icons, photographs, textual indicia, and the like, intended to convey information about the meaning of the structured data to a user in a simple, consistent, and comprehensible manner.

As used herein, "structured data" may be taken as follows: If there is a set of users Joe, Bob and Dan, then most people in the field of information processing can easily agree that they would recognize a variety of representations in memory or on a storage medium as data: A properly delimited sequence of characters, an array of references to name strings, a collection of objects, etc.

If the definition would be the union of a set of users Joe and Bob with another set Bob and Dan, then there might be some representations of that definition which some people would like to argue is, or comprises code. For the purpose of this disclosure, however, which concerns itself with the display of information, there is nothing but structured data. The duality of data and code is obvious at least when so-called code is generated by some compiler or operated on by a code manipulation tool, e.g. an optimizer: Then code is treated as data. Traditionally in Lisp the definition of functions is data itself. Java byte codes are code, but they are bytes, hence data. Compiled C++ code might be hardware brand specific, but it still is made of bytes, hence data.

Figure 3:
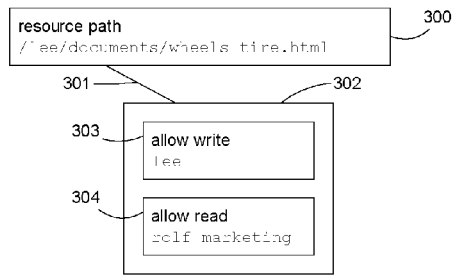
FIG. 3: Structured data defines access control settings for a resource.
Figure 4:
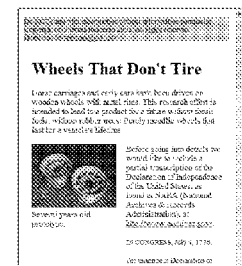
FIGS. 4 to 6: Defining structured data may contain references to other resources within the hierarchy of resources.

As an example, FIG. 3 shows for the resource identified by the path 300 there is 301 structured data 302 that defines access control settings for the resource. With common sense one can recognize in this simple example what a good implementation of the present invention can recognize with programmatic exactness: User Lee is allowed to write 303, user Rolf and every user in group Marketing are allowed to read 304.

The present invention departs from prior art in that the defining structured data may contain references to other resources within the hierarchy of resources. Access control settings of such referenced other resources, if there are any, are by predetermined algorithm merged with the structured data to determine effective access control settings for the resource. One easily comprehensible predetermined algorithm is to perform unions of the sets of entities which make up the access control settings of the referenced other resources and the corresponding sets of entities which are defined by the structured data.

Figure 5:
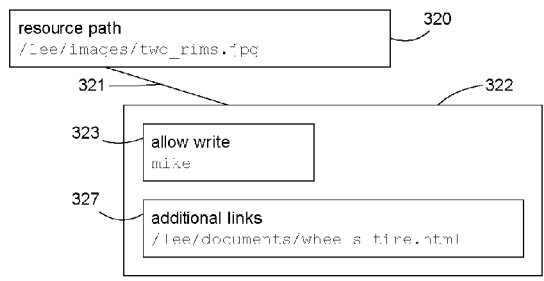
Figure 6:
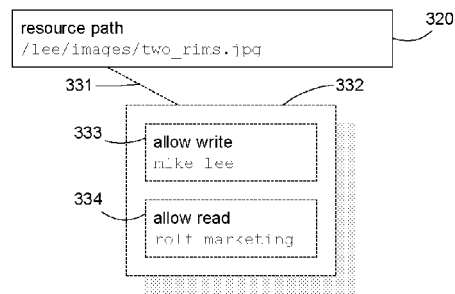

As an example, FIG. 5 shows for the resource identified by the path 320 there is 321 structured data 322 that defines access control settings for the resource. It contains a reference 327 to another resource, which in this example is the resource from FIG. 3. FIG. 6 shows effective 331 access control settings 332, which result from merging settings, specifically from performing a union of the corresponding "allow write" sets 303, 323 to determine the effective "allow write" set 333.

The present invention further allows inheritance within the hierarchy of resources to define access control settings for a resource, in case there is no directly defining structured data for a resource. Inheritance within the hierarchy may be either from the first instance of defining structured data found in the ancestral chain only, with searching starting from the resource itself, or it may perform an accumulative operation on multiple instances of defining structured data found in the resource's ancestral chain.

Figure 7:
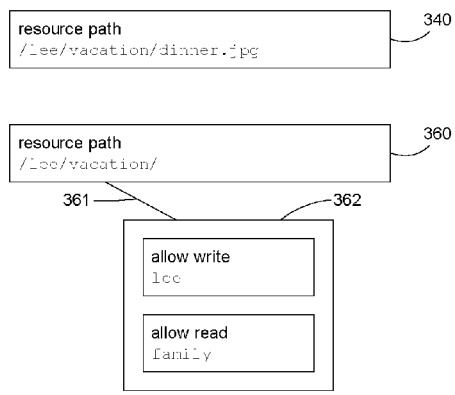
FIGS. 7 to 8: Inheritance within the hierarchy of resources defines access control settings for a resource in case there is no directly defining structured data for a resource.
Figure 8:
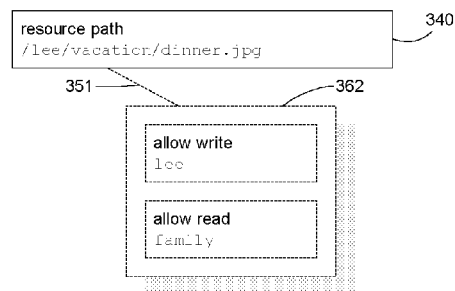

As an example, FIG. 7 shows for the resource identified by the path 340 there is no structured data that defines access control settings for the resource. There is 361, however, structured data 362 that defines access control settings for its parent 360 within the hierarchy of resources. FIG. 8 shows effective 351 access control settings 362, which are inherited from the parent.

When using the techniques of the present invention described in this section, (1) dependencies of access control settings for resources can be created which with a reference can reach across branches to anywhere within the hierarchy of resources, (2) rules for merging settings can be easily comprehensible, and (3) a number of inheriting resources can share a single instance of defining structured data.

An excellent example for the advantages of these techniques is the case of a document that by reference includes an image, which may be in a directory on a different branch of the hierarchy, as in FIGS. 3, 4, 5, and 6. If the access control settings defining structured data for the image contains, possibly nothing but, a reference to the document then the image automatically should be accessible to all users who can access the document, unless, to be exact in this description, one has taken extra effort to make additional settings. When an operator modifies the access control settings for the document it then is not necessary for the operator to make any changes for the image. The dynamic nature of the reference ensures that the image automatically will be accessible to all users who can access the document even as that set of users may change.

In order to always correctly reflect changes occurring in access control settings defining structured data, i.e. to correctly propagate such changes to when and to where access control settings are being used, an implementation of these techniques, as should be obvious, must avoid storing effective access control settings unless for every cached effective access control setting there are mechanisms put into place to invalidate that cache when appropriate.

An example for using more than one reference in one defining structured data could be a biologist's photo of a rare beetle which would be required to be seen both by relatives, who get a personal letter, and by colleagues, who get a scientific paper. Having two references in one defining structured data is key to keeping effective access control settings correct without requiring operator intervention, even when relatives or colleagues are being added to or removed from access to the letter and to the paper respectively.

Examples for use of inheritance could be any directory containing any size number of files, e.g. photos, publications, correspondence, messages, or office records, but also e.g. records from a database or other source which are exposed through a URI syntax.

In implementations of the techniques of the present invention it may become useful to enforce limits on the complexity of hierarchies of dependencies by reference. One possible limit could be a maximum of one reference per defining structured data. Even more strict would be if that maximum one permitted reference if present would preclude any other contents in the same defining structured data, which effectively would allow either a reference to another resource, or directly defined access control settings only, but not both, no merging. Some kinds of limits could ease implementation of caching techniques and other algorithms. (It is also useful to anticipate the creation of circular references of access, and to properly parse and handle such references.)

In practice, it has proven useful to the inventor to use two special ids for special meanings: (1) "*", Unicode x002A Asterisk, for any validly identified user, and (2) "+", Unicode x002B Plus Sign, for anonymous.

One skilled in the art can find more than one way to implement access control which practices the techniques described in this section. In at least one implementation, access control which comprehensively practices the techniques described in this section has been implemented successfully in less than one hundred kilobytes of source code, fitting into Apache Web server software as independently compiled module, storing access control settings defining structured data with an LDAP server, and providing a user interface of HTML frames, forms, and tables through the use of servlets.

What has been described in this section could be implemented independently from other techniques of the present invention. The techniques in different sections of this disclosure work together well, enhance each other, add to each other's strengths, have been developed to meet or solve the same, similar, or interdependent needs or problems, serve the same purpose, work towards a common goal, play together like instruments in an orchestra, but they could be employed independently. If described independently each section might sound like an instrument in an orchestra playing on while the other instruments have turned mute, i.e. somewhat out of place, lonely and disconnected.

Graphical User Interface

Ideas that have guided and should guide the development and implementation of the present invention include:

(1) If people initially have difficulties understanding something then showing them different views of the same matter often improves their understanding.

(2) If people have difficulties understanding a set of rules then showing them the effects of the rules applied in reality often improves their understanding.

(3) If something is made easy enough then people are more probable to use it consistently.

(4) If operator preferences are not known in advance then making the user interface adjustable allows the system to accommodate operators on the spot.

(5) If access control information can be represented in a small enough display region then it can become a fixture in the display of any and all resources.

(6) Good user interface should help its targeted group of operators to consistently make the correct decisions with the least amount of effort.

Figure 9:
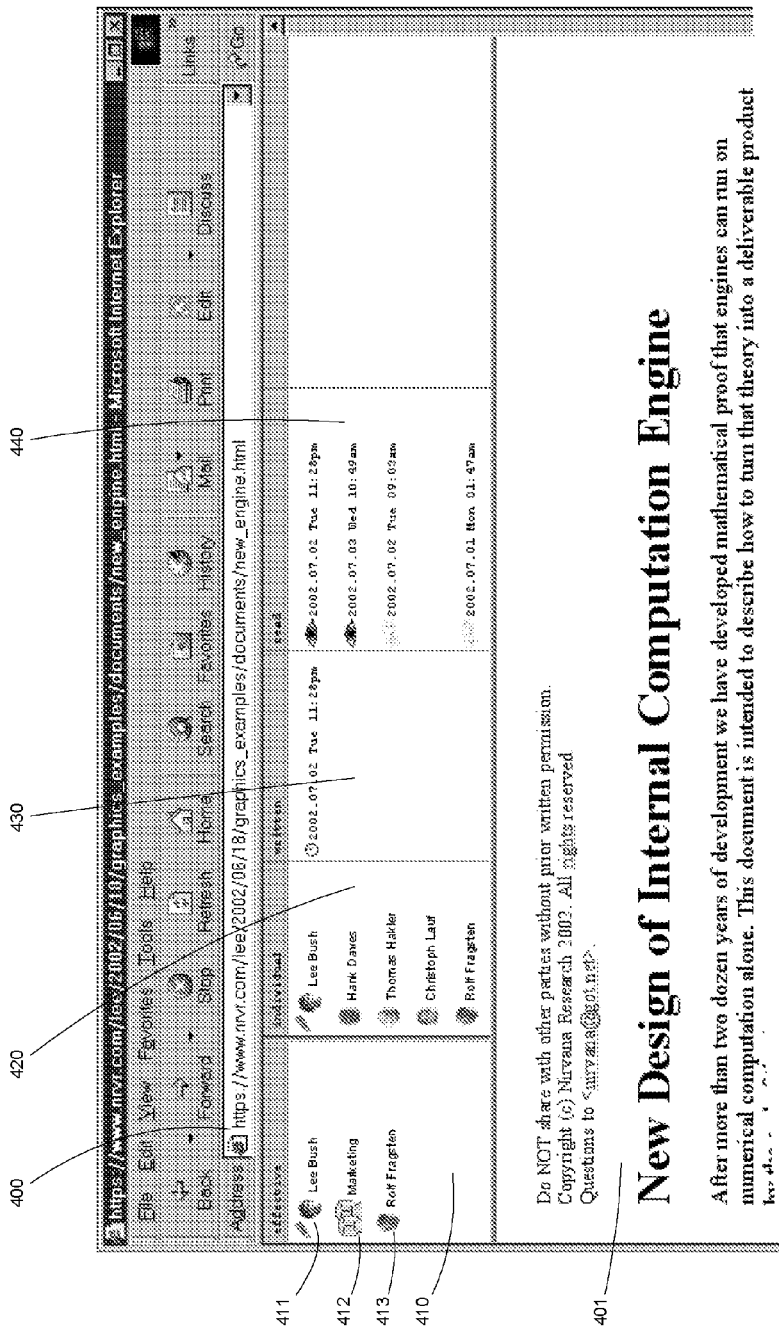
FIG. 9: A comprehensive view, with log display.

FIG. 9 shows a moment in the user interface of an implementation of the present invention. For a given URL 400 the Web browser shows a familiar representation 401 of the document. Adjoining there is a region 410 with a representation of the effective access control settings for the document. User Lee 411 has write privilege, as indicated by a green pencil next to the user's id. Group Marketing 412 has read privilege. User Rolf 413 has read privilege. Further adjoining there is a comprehensive representation of log information. Organized like columns and rows in a table, for each individual user 420 it shows the most recent write access 430, and the most recent read access 440. A clock icon indicates that user Lee has written the most recent version. Eye icons indicate that user Lee and user Hank have seen the most recent version. Faded stamp icons indicate that user Thomas and user Rolf have seen an old version. A blank entry indicates that user Christoph has not yet seen the document at all. Blank entries in the write access column indicate that no user except user Lee has modified the document by writing, which could be expected in this case as user Lee is the only user who has write privilege.

Figure 10:
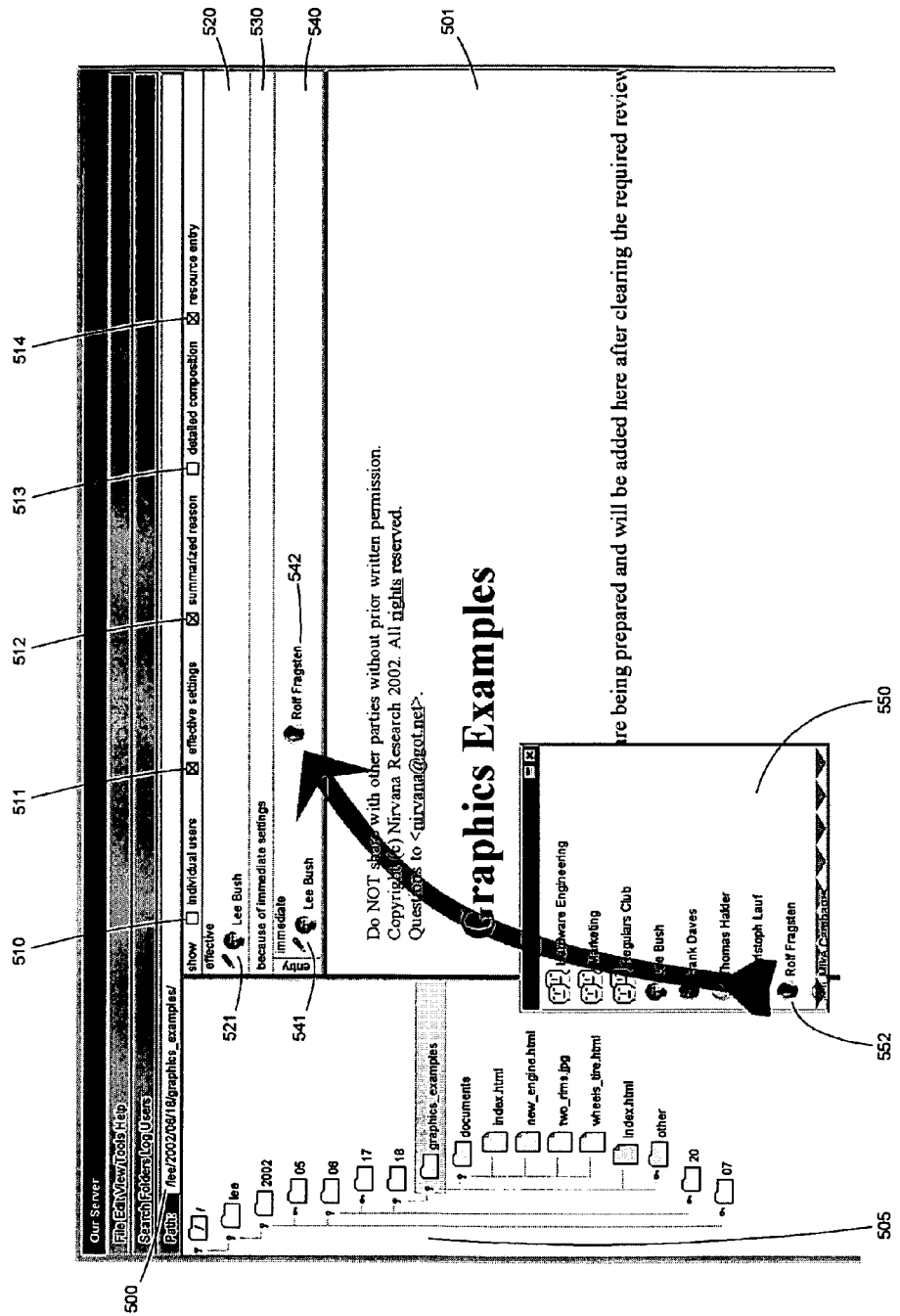
FIG. 10: Drag and drop a user.

FIG. 10 shows a moment in the user interface of another implementation of the present invention. For a given path 500 of a directory the browser shows a familiar representation 501, which without relevance to the present invention happens to be generated by the server from an index.html file by using a well known technique. In an integrated tree view 505 of the hierarchy of resources the directory is highlighted for clarity. In an integrated control region, check boxes 510, 511, 512, 513, 514 allow the operator to invoke functions which add and remove display regions with different representations of access control information relating to the selected resource, in this example i.e. the given directory. In this example the check boxes also provide feedback as to which display regions are currently being shown.

Adjoining there is a region 520 with a representation of the effective access control settings for the document. User Lee 521 has write privilege, as indicated by a green pencil next to the user's id. Adjoining there is a region 530 with a sentence fragment that summarizes the reasons why the effective settings are such as they are. Other examples in this disclosure show different wording in that region. It is a subtle hint to beginning operators who are not yet familiar with the symbolism of the user interface, a symbolism that both has to correctly convey matters of access control settings as well as it has to fit into limited display regions, hence a symbolism that may have to do things in innovative ways, such innovative ways then requiring explanation. One could think of it as optional help for beginning operators. Check box 512 could switch off this region 530.

Adjoining there is a region 540 with a representation of the directly defining structured data for the resource, which in this example implementation also is called "resource entry". Another example in this disclosure shows somewhat more complex information in that region. User Lee 541 is being defined to have write privilege, as indicated by a green pencil next to the user's id. In this region 540 is where settings actually can be manipulated. That possibility is hinted at by the white background region, which is in contrast to the previously described two regions 520, 530, which have gray background to indicate that they only display resulting facts that cannot be manipulated directly. User Rolf 542 is in this moment being dragged in from a display region 550 with representations of known users and groups in order to be defined to have read privilege. As dragging is still in process, a condition that lasts for the order of magnitude of a second, user Rolf is not yet being displayed in the region 520 for effective access control settings.

User Rolf 542, 552 has been dragged from a display region 550 with representations of known users and groups. This region 550 had been hidden until the operator has activated it.

FIG. 10 is out of a sequence of Figures that show a few steps in an implementation of the present invention. That sequence in order would be FIGS. 11, 12, 10, 13, 14. Another sequence which shows a few steps in the same implementation of the present invention is FIGS. 15, 16, 17, 18, 19, 20, 21, 22, 23. These sequences are not shown proportionally in time, i.e. some of the steps shown here would be shown for a second only once an operator has become familiar with their dynamics, while some of the steps would be on the screen for extended periods of time. These intermediate steps are essential for operator comprehension. The intermediate steps had to and will have to be designed with the same attention to detail as the more permanently displayed steps.

The implementation shown in FIGS. 10 to 23 depicts the inventor's present preferred embodiment implementation and various improvements are desirable and may be expected. There are, however, important concepts being shown: How different display regions can show different transformations applied to the structured data which defines the access control settings for a resource; how display regions can be hidden and brought back; the convenience of having access control integrated with document display and with browsing; picture ids; and drag and drop.

As used in connection with the present invention, the term "transformation" is to be understood in the following context: If there is a set of users Joe, Bob and Dan, then references to them might be stored in an array, e.g. [Joe, Bob, Dan]. The index of Joe would be 0, of Bob would be 1, of Dan would be 2. In the display region some representation would be shown for each user. The coordinates x,y might be for Joe 5,25, for Bob 105,25 and for Dan 205,25. This represents one simple transformation.

Transformations may not only include numeric transformations, but also can include e.g. lookup of an image in a database, using a string user id as key, and subsequent image manipulation, i.e. transformation from string "Joe" to a cropped bitmap of his photo ID.

One example simple algorithm to determine the coordinates to display each user could first sort, e.g. by static information such as name, employee id or by dynamic information such as most recent access to a document, then position first user in upper left corner, subsequent users to the right of previous user, optionally using constant space per user or as much space as needed to display variable size items such as name, and if positioning to the right causes overflow to the right then wrap around to start another row below.

Transformation is from one mathematical or otherwise theoretical space into another. Many different algorithms may be used within the knowledge of one of ordinary skill in the art.

It should be understood that the present invention is applicable in a broad variety of uses. In a more limited scenario, when there is little need to make changes, but mostly need to review access, then employing some techniques of the present invention still would be advantageous, but then studying these two sequences of Figures would not be as valuable as if someone wanted to employ all techniques of the present invention.

The implementation shown in FIGS. 10 to 23 may be using some older terms which are a little bit different from the rest of this disclosure. In case of conflict, the terms used in this disclosure are considered the preferred terms.

Purpose of example sequences: After authoring documents in directory "graphics_examples" the operator, Lee, wants to give user Rolf read privilege for all of directory "graphics_examples" and to give group Marketing read privilege for directory "documents" only.

Figure 11:
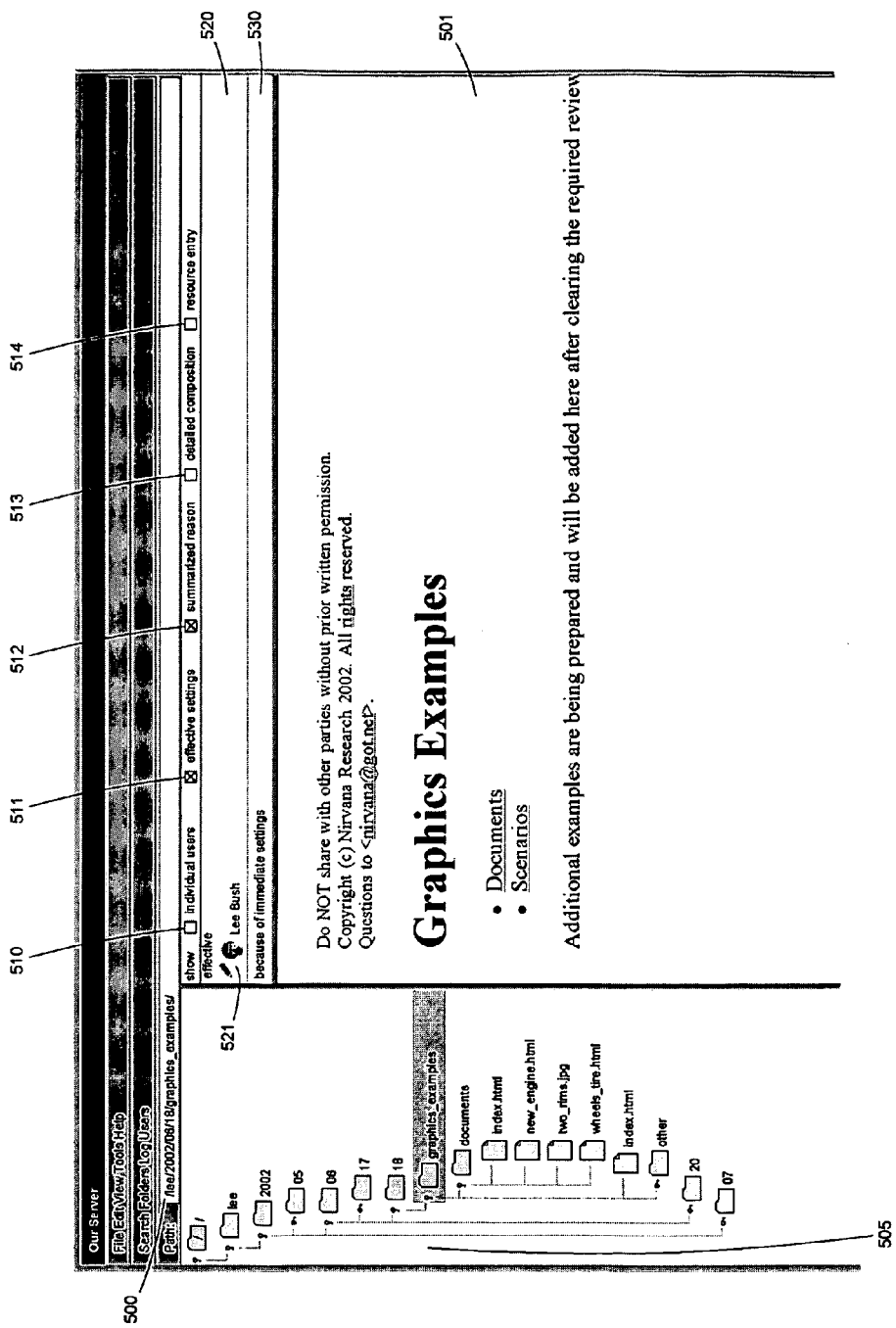
FIGS. 11 to 23: Sequences of steps in using an implementation of the present invention.
Figure 12:
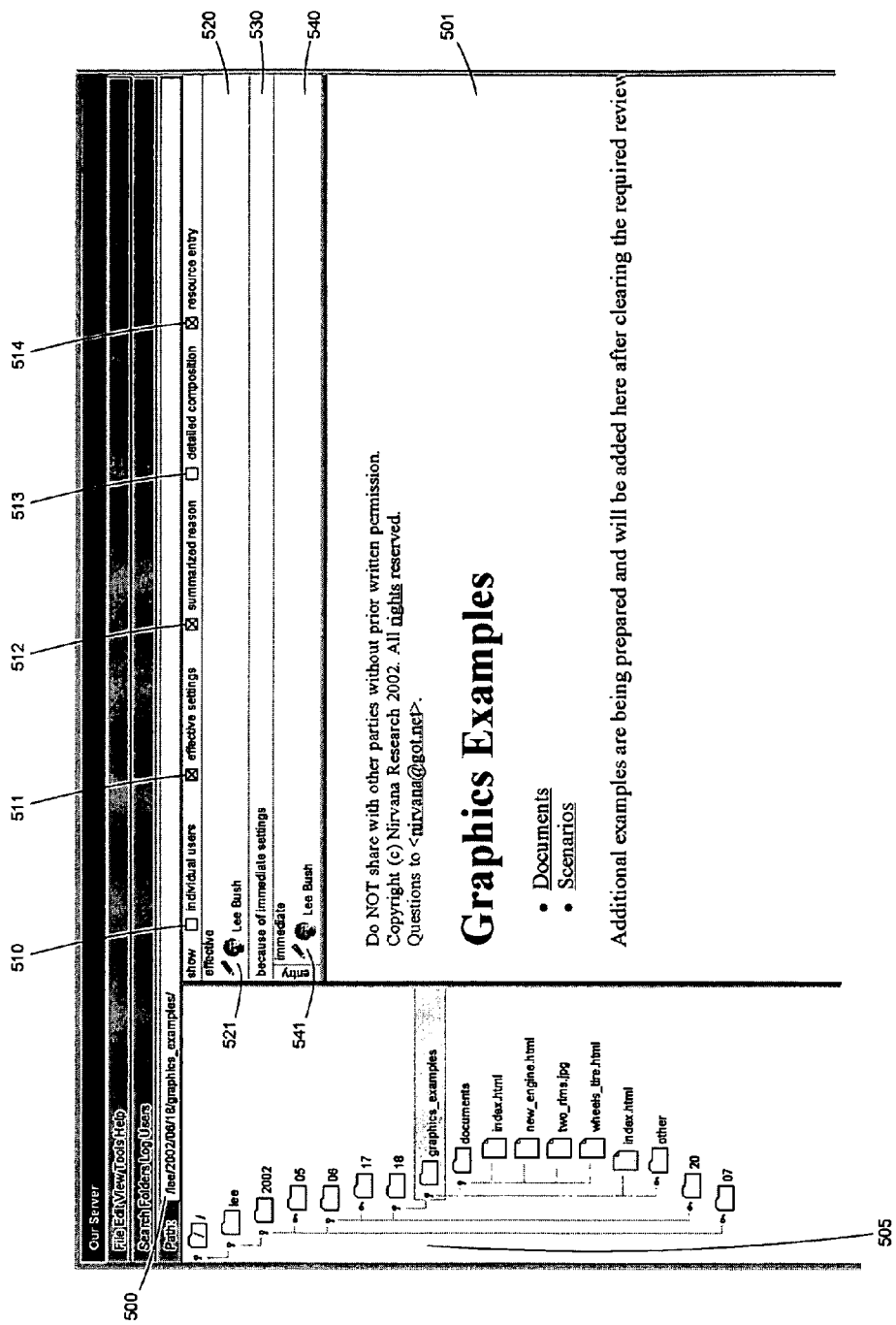
Figure 13:
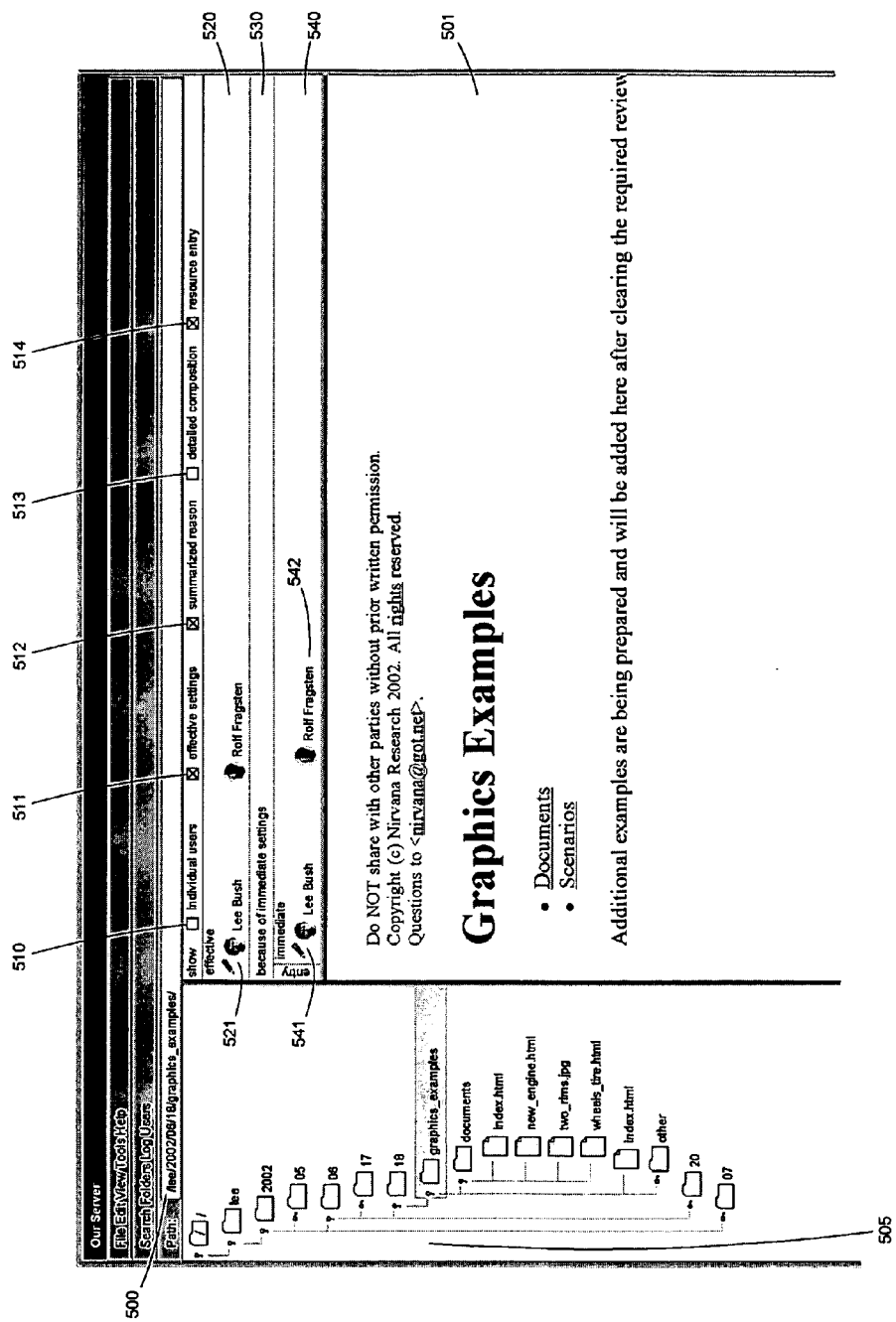
Figure 14:
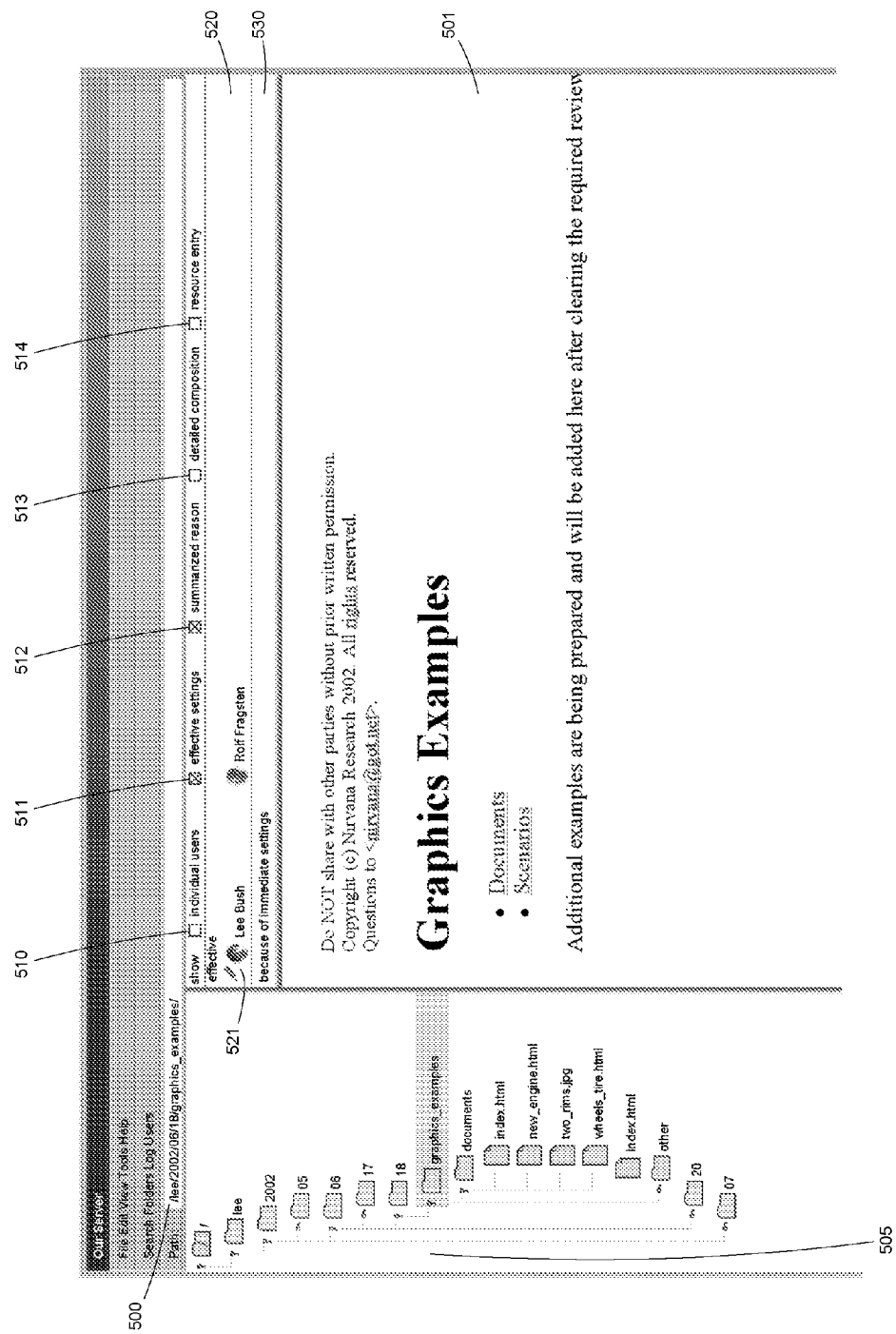

First example sequence, giving a user read privilege for a directory: FIG. 11 shows the result of nagivating to "graphics_examples", e.g. by clicking on its icon in the tree on the left. FIG. 12 shows the effect of clicking on the "resource entry" check box, i.e. in addition to unmodifiable "effective" settings also show "immediate" settings within the "entry". FIG. 10, out of numbering sequence, shows after pressing a key combination a display region with representations of known users and groups, from which user Rolf is being dragged onto "immediate" settings. FIG. 13 shows the effect on "immediate" settings, and on "effective" settings. FIG. 14 shows after the known users and groups have been hidden already it is possible to completely go back to the original display layout, by hiding the "entry", with the "immediate" settings, by clicking on the "resource entry" check box.

Giving a group read privilege would be as easy as giving an individual user read privilege. To illustrate something more complex, however, here we assume the operator wants to give group Marketing read privilege for one specific subdirectory only.

Figure 15:
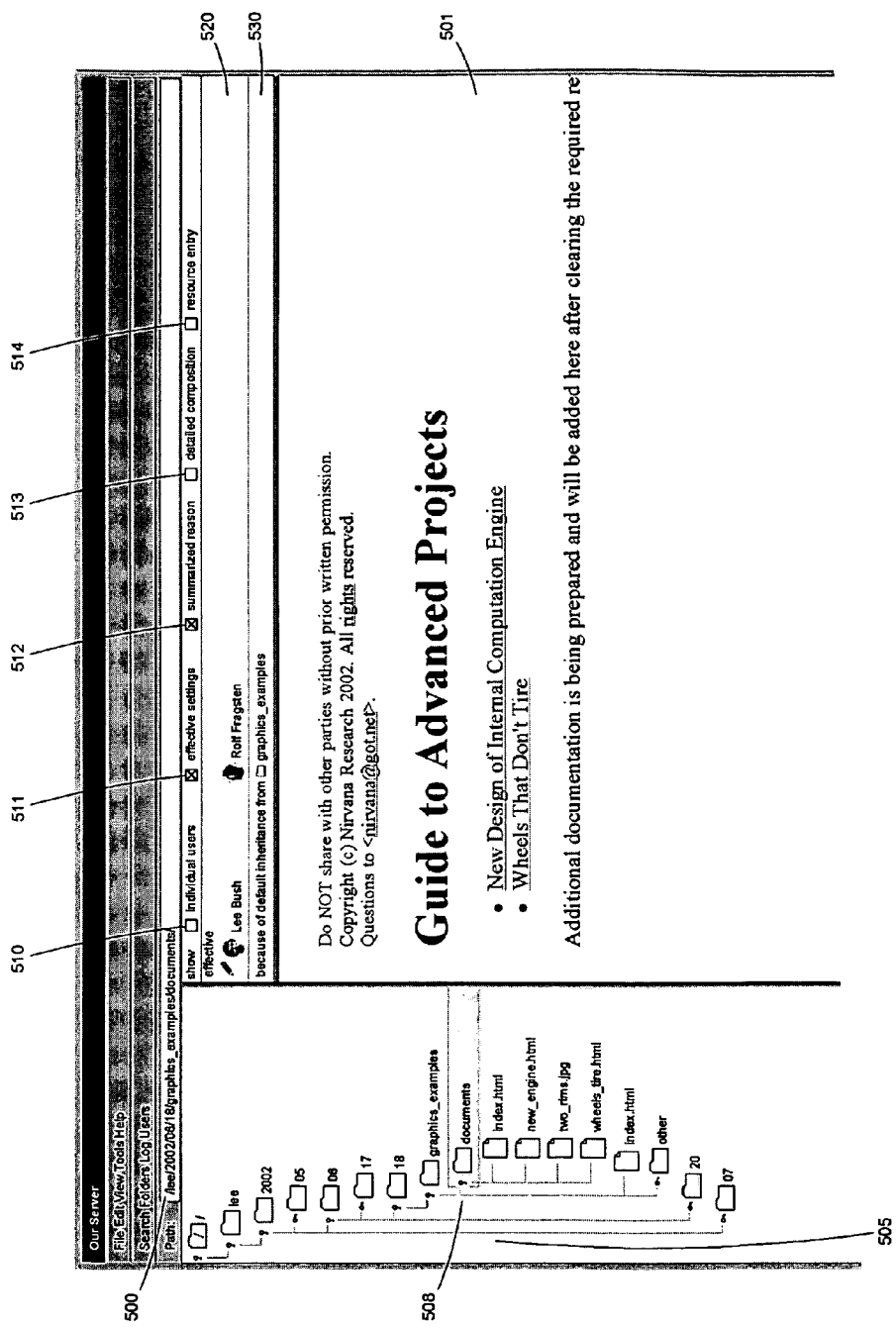
Figure 16:
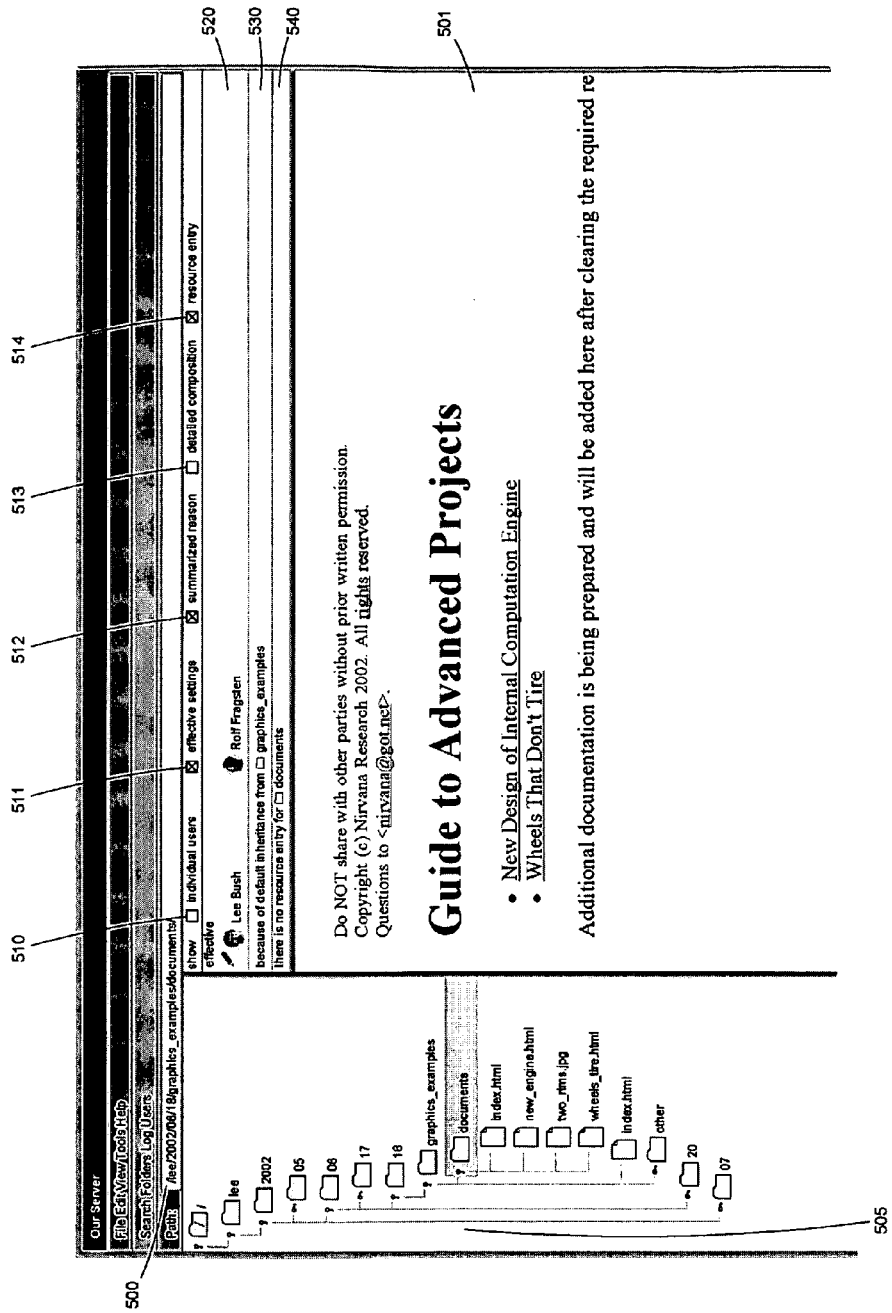
Figure 17:
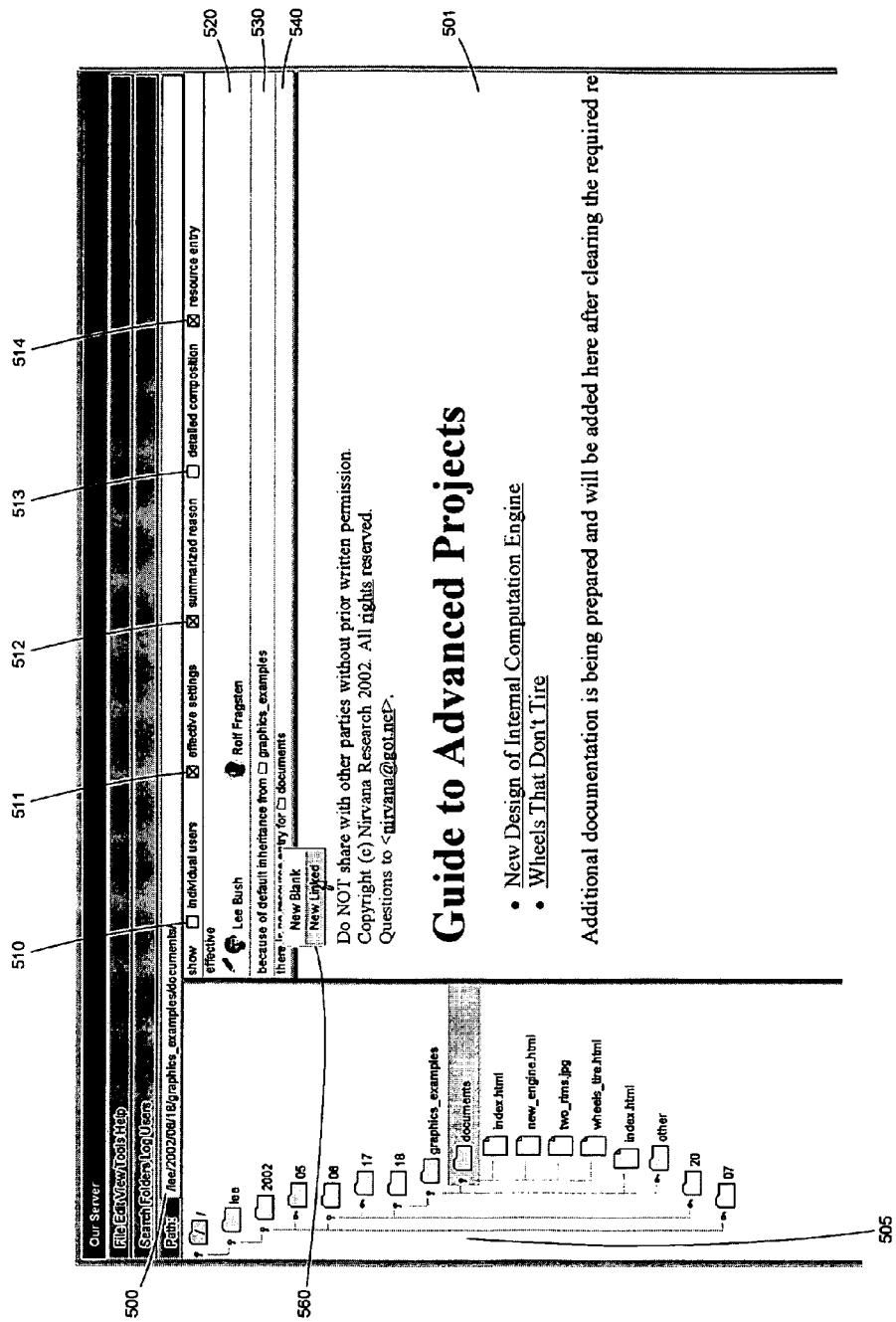
Figure 18:
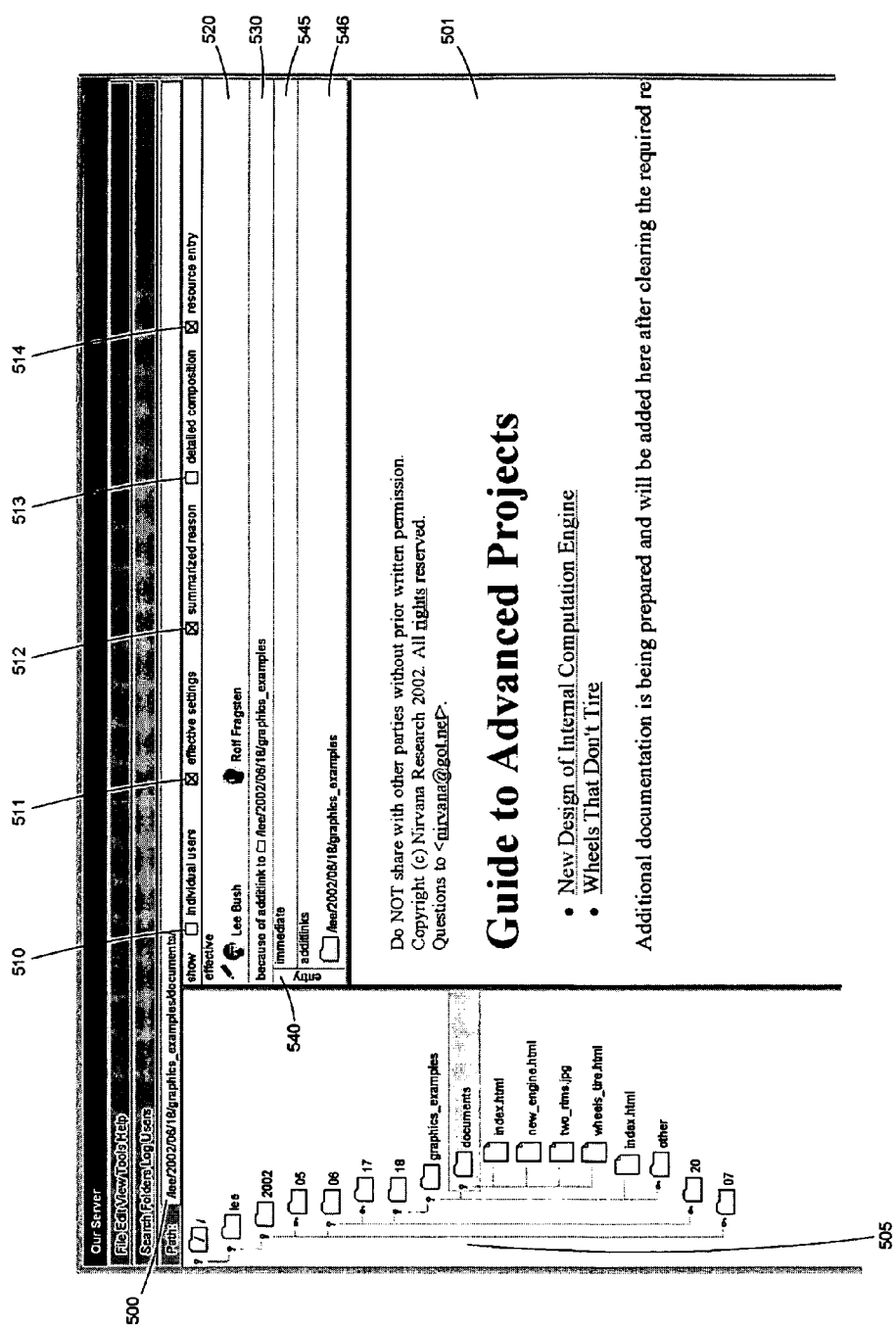
Figure 19:
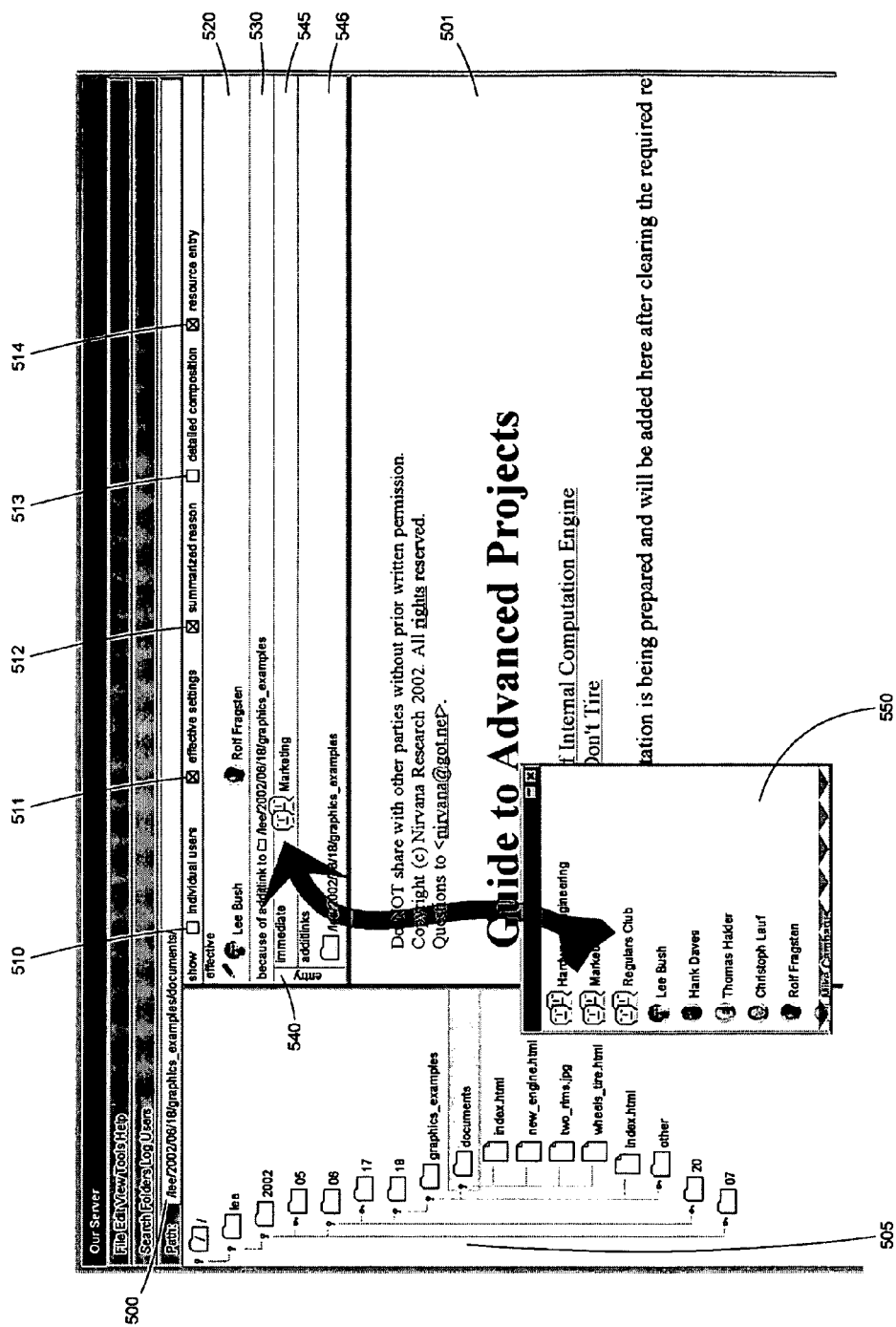
Figure 20:
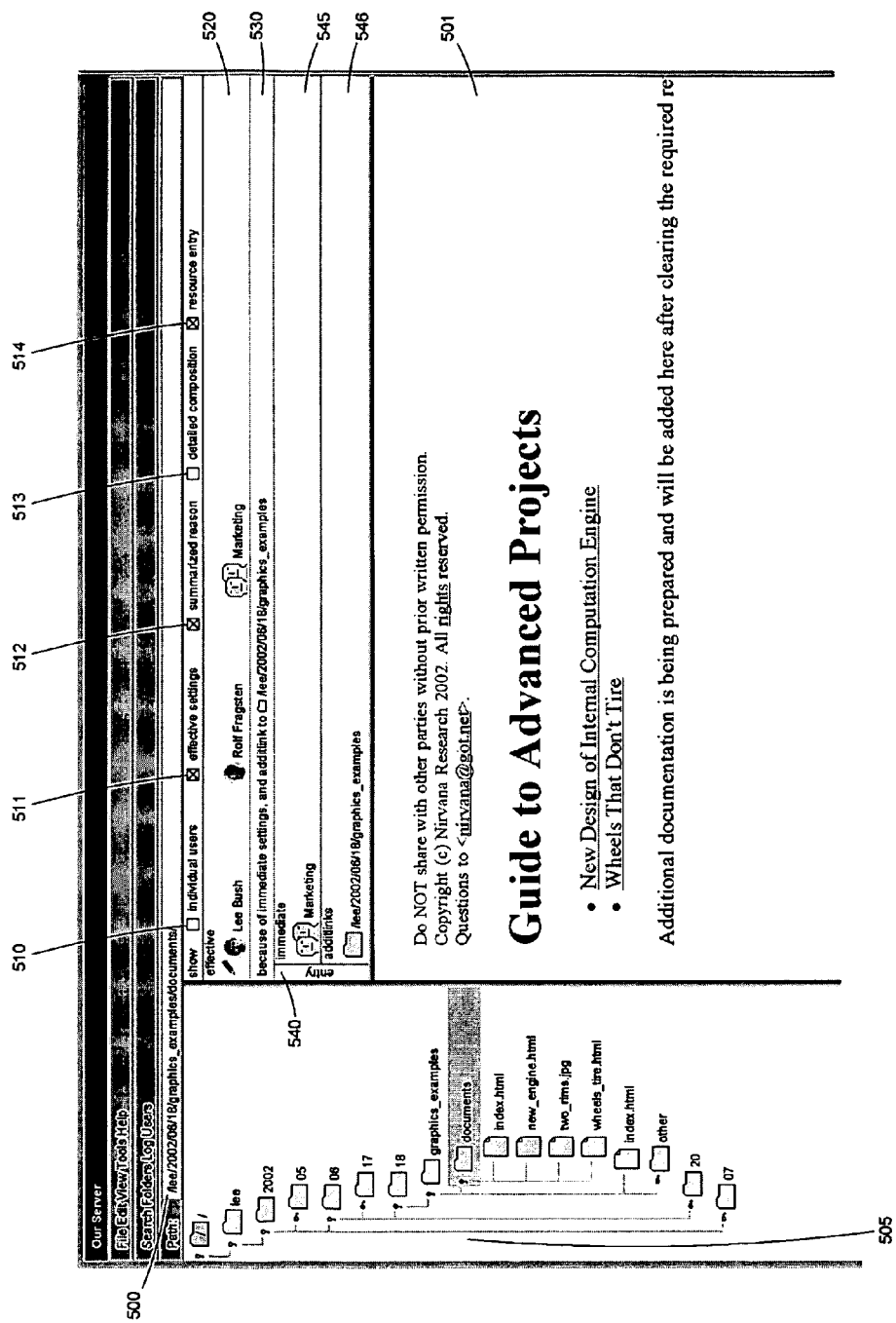
Figure 21:
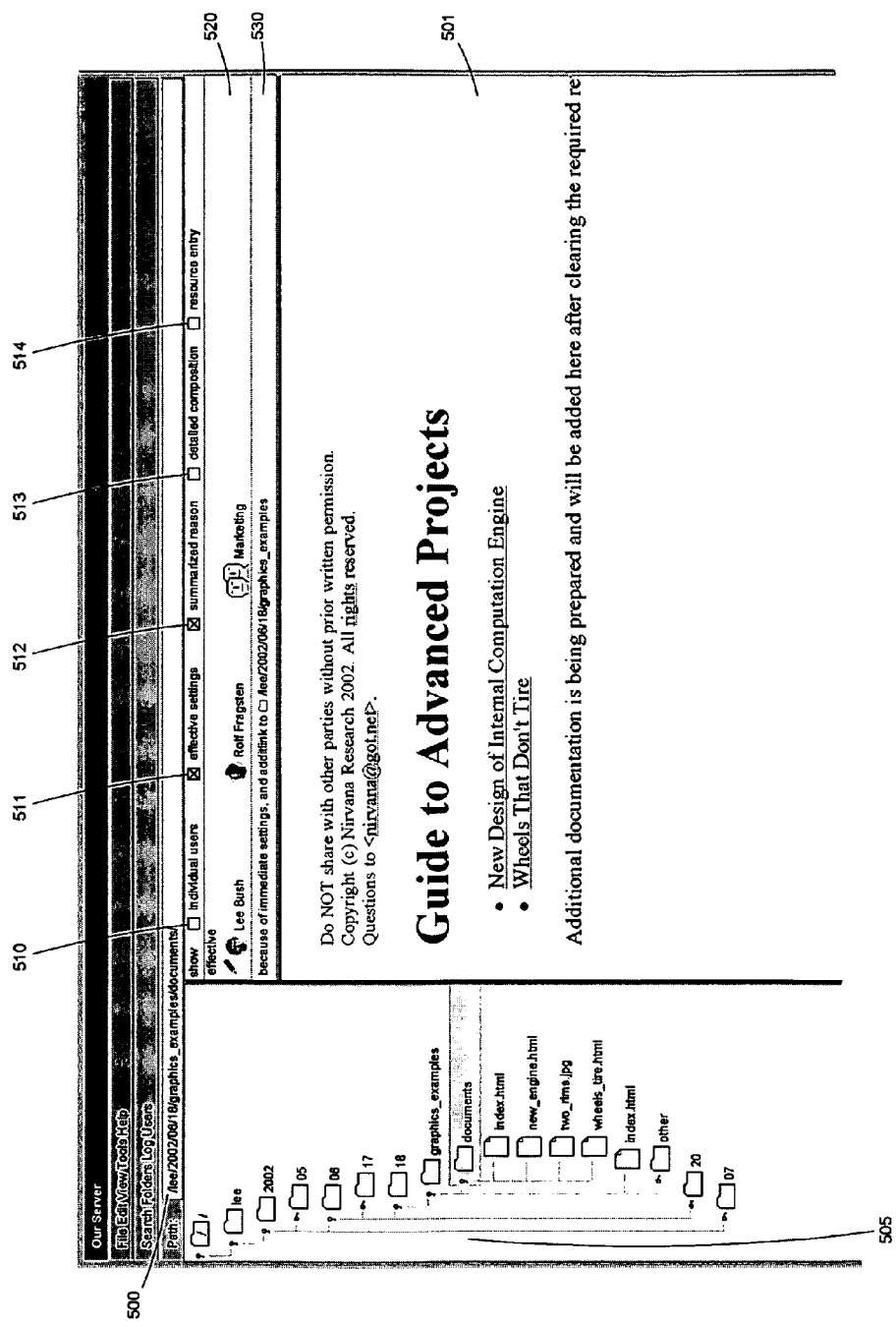
Figure 22:
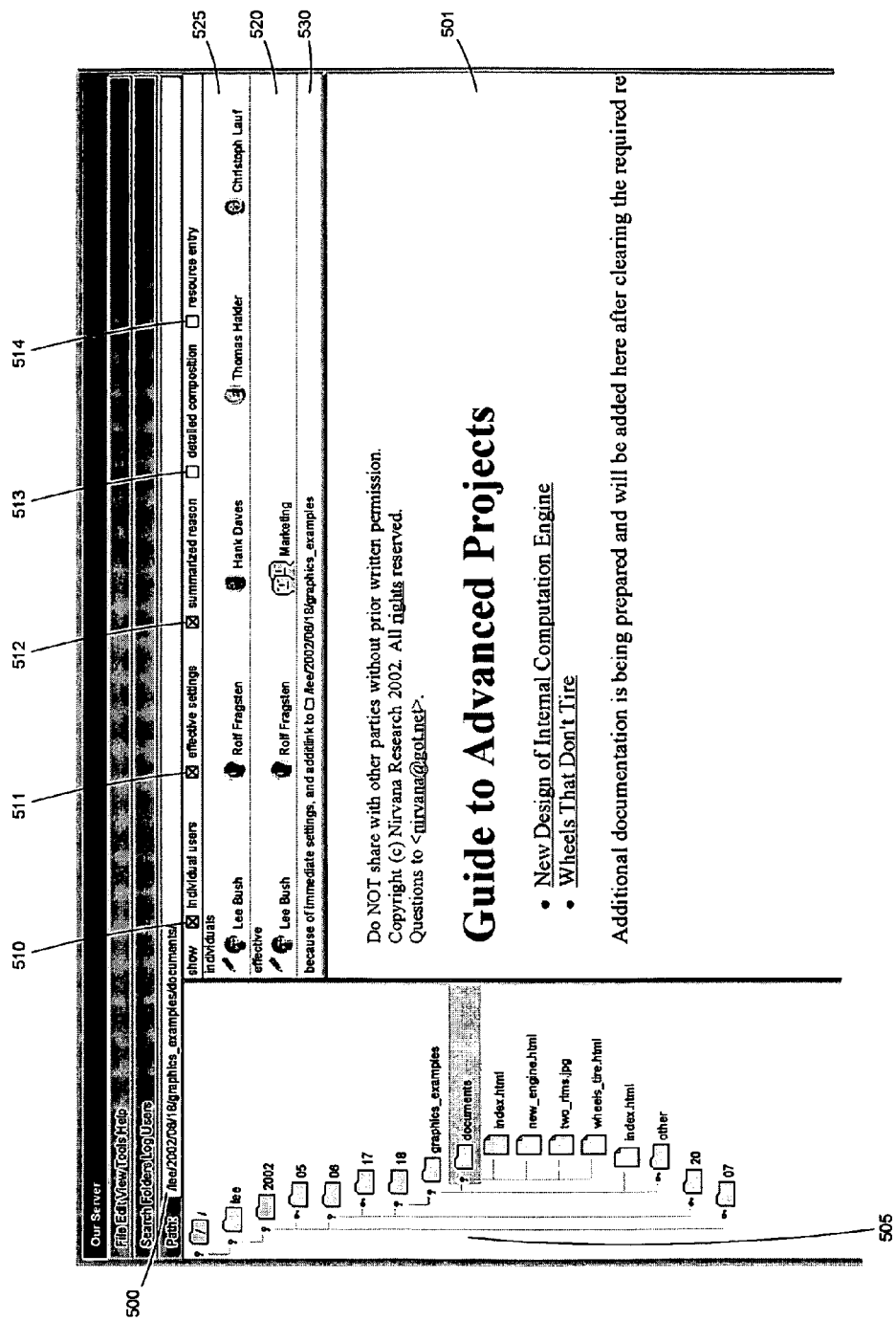
Figure 23:
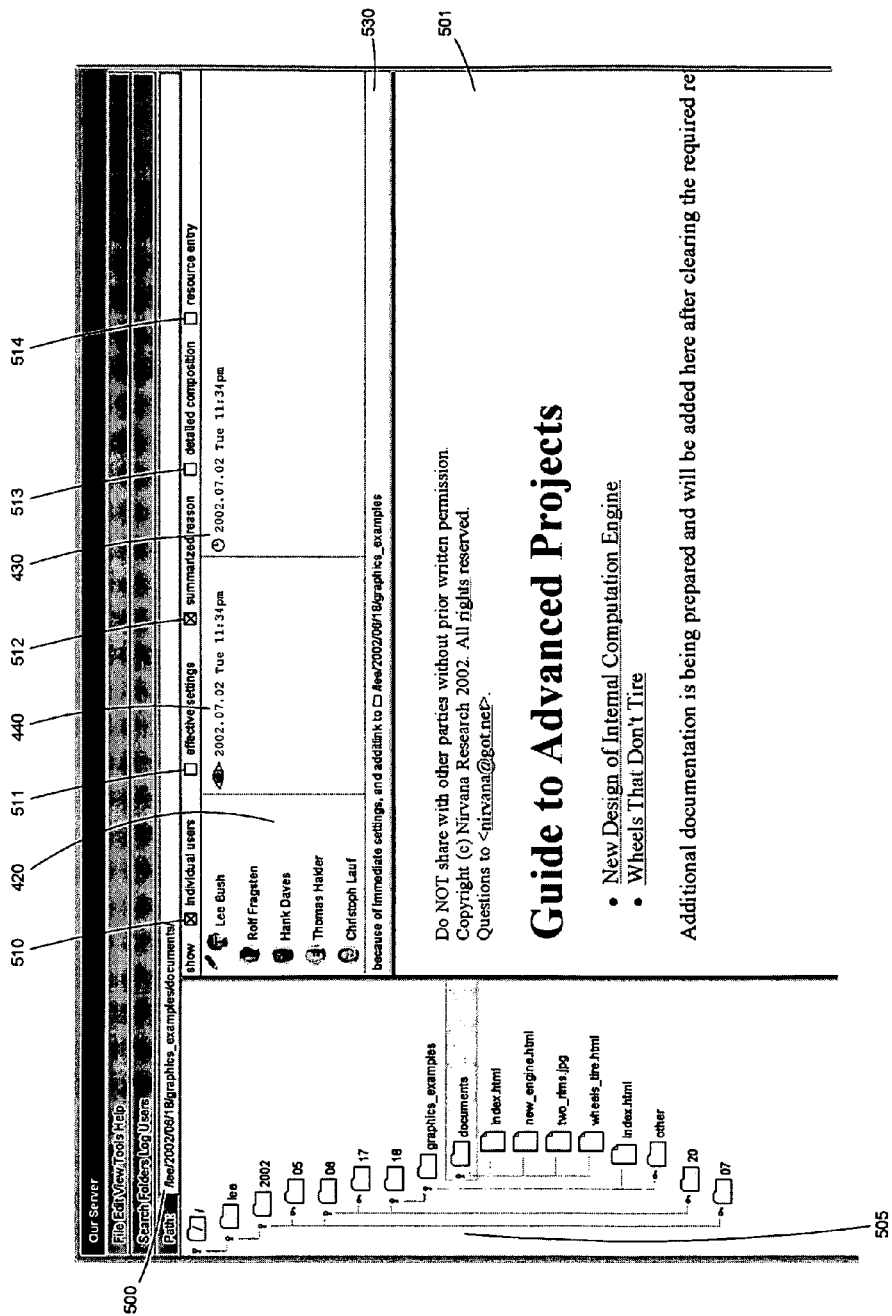

Second example sequence, giving a group read privilege for a subdirectory only: FIG. 15 shows the result of navigating to "documents", e.g. by clicking on its icon 508 in the tree on the left. FIG. 16 shows the effect of clicking on the "resource entry" check box. FIG. 17 shows by context sensitive popup menu 560 creating a new "resource entry", linked as if there were "default inheritance". FIG. 18 shows the effects on "immediate" 545 settings and on additional links 546, within the "entry" 540. FIG. 19 shows after pressing a key combination a display region 550 with representations of known users and groups, from which group Marketing is being dragged onto "immediate" settings. FIG. 20 shows the effect on "immediate" settings, and on "effective" settings. FIG. 21 shows after the known users and groups have been hidden already it is possible to completely go back to the original display layout, by hiding the "entry", with the "immediate" settings and the additional links, by clicking on the "resource entry" check box. FIG. 22 shows it is possible to show "individuals" 525, in addition to "effective" settings, by clicking on the appropriately named "individual users" check box. FIG. 23 shows another practical display layout chosen, having transitioned from FIG. 22 by context sensitive popup menu.

Figure 24:
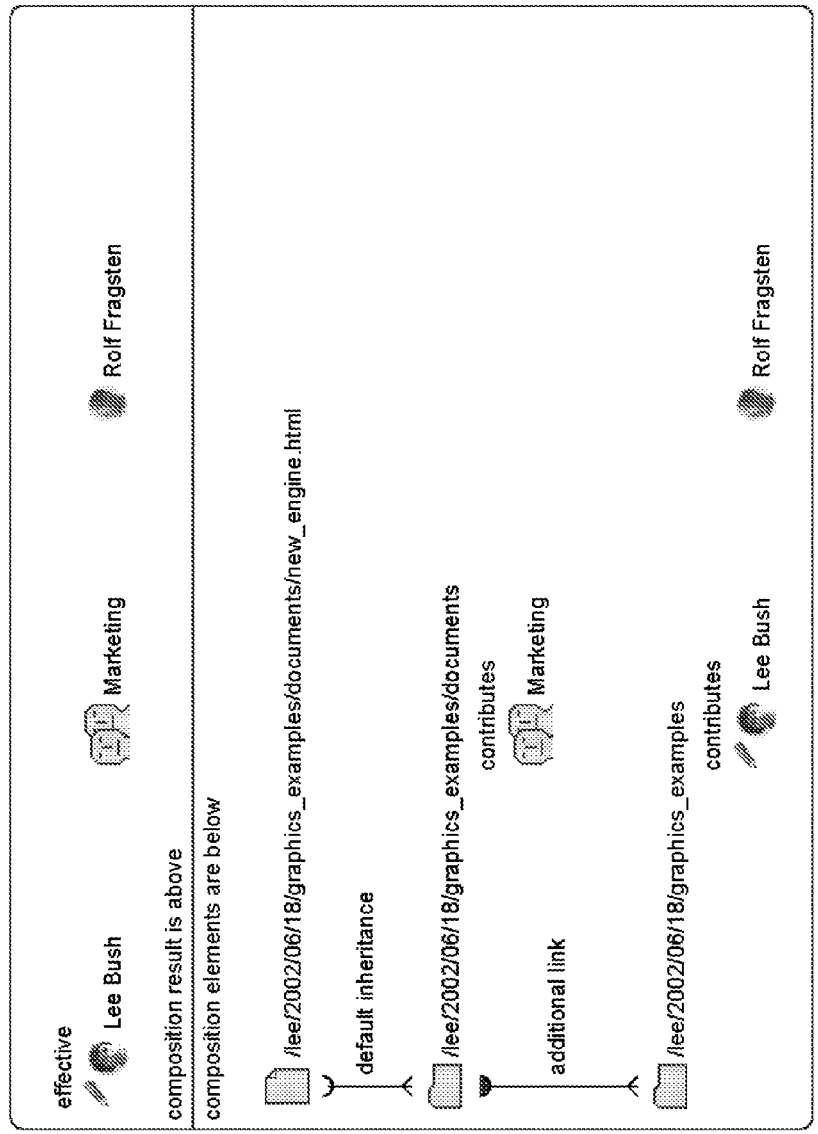
FIG. 24: An example illustration of how composition of access control settings works.

FIG. 24 shows from an early implementation of the present invention an example illustration of how composition of access control settings works. Since the making of that illustration more effort has been put into showing more information more comprehensibly in less space, but this illustration still serves as an example of what is covered by the expression "graphical representations of the results of transformations applied to the structured data which defines the access control settings for the resource", which is being used in this disclosure.

The present invention provides a graphical user interface for representing and manipulating access control settings for a resource.

The present invention departs from prior art in that a set of display regions for graphical representations of the results of transformations applied to the structured data which defines the access control settings for the resource appear integrated with a familiar display region for a representation of the resource, e.g. with the main view in word processing software, or with the main view in Web browser software. A number of functions should be implemented which modify the layout of the display regions, e.g. horizontal or vertical, or different relative or absolute sizes, and those functions should be available for invocation by the operator, e.g. through mouse gestures, or through key combinations. Also, functions may be implemented which modify the number of the display regions, i.e. add or remove some, and those functions should be available for invocation by the operator, e.g. through mouse gestures, or through key combinations. Further, a number of functions should be implemented which modify the transformations, either slightly, by modifying transformation parameters, or fundamentally, by switching algorithms, or in other ways, and those functions should be available for invocation by the operator, e.g. through mouse gestures, through key combinations, through menu choices, or through dialog boxes.

It is assumed that standard object oriented mechanisms are put into place to automatically effect display of corresponding access control settings when a different resource is being displayed, e.g. because the operator has followed a link or has navigated in some other way.

Because of the desire and need to keep display regions small, active regions for mouse gestures not necessarily have to be visually marked at all times. Visual feedback may be given by a changing cursor, or when a modification key is being pressed, e.g. the Alt-key.

The identity transformation is a transformation too. One of the most useful transformations might be groups and users flattened to users only. Other possible transformations include: Aggregation of users into groups, sorting by name, or by affiliation.

Certain combinations of modifying the layout of display regions and modifying the number of display regions might be more commonly described as "folding away" an extra display region.

GUI Photo Ids

The present invention further, and most visually striking in the context of access control, can graphically represent users by displays that comprise a photographic likeness of the user. Each photographic likeness should be processed by a method which, depending on quality desired to achieve and depending on computation effort willing to expend, comprises one or several of the steps of: (1) adjusting image color saturation toward a predetermined target saturation level; (2) converting to grayscale; (3) adjusting image brightness toward a predetermined target brightness level; (4) adjusting image contrast toward a predetermined target contrast level; (5) adjusting image sharpness toward a predetermined target sharpness level; and (6) masking with a shape such as an oval or an outline of a bust, the steps to be taken in an order that depends on which of these steps. A number of functions should be implemented which for an individual user result in different graphical representations, e.g. photo id, business card, icon, or name plate, and those functions should be available for selection by the operator, e.g. through menu choices or through dialog boxes, for immediate and subsequent use.

Figure 25:
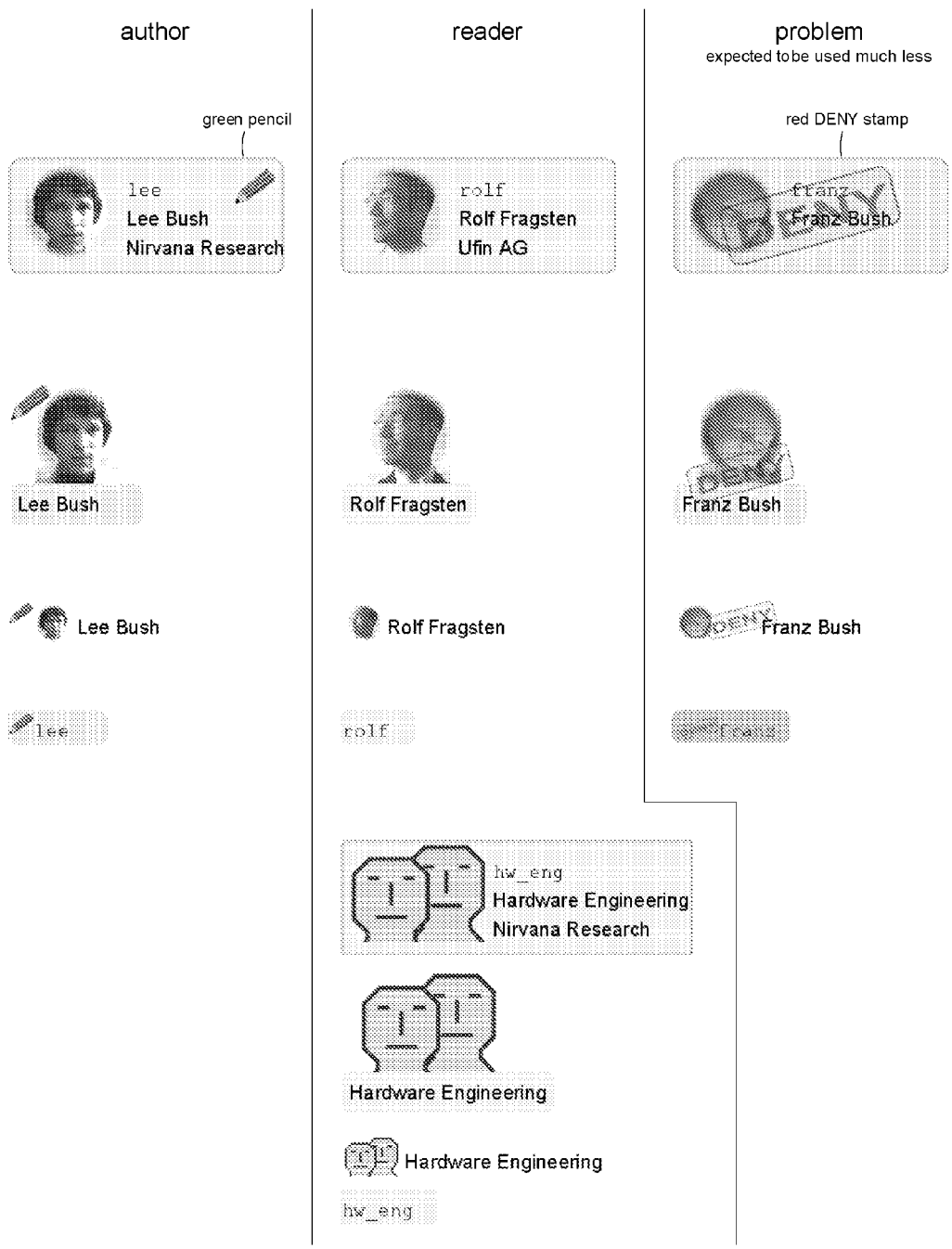
FIG. 25: Different graphical representations for users and groups.
Figure 26:
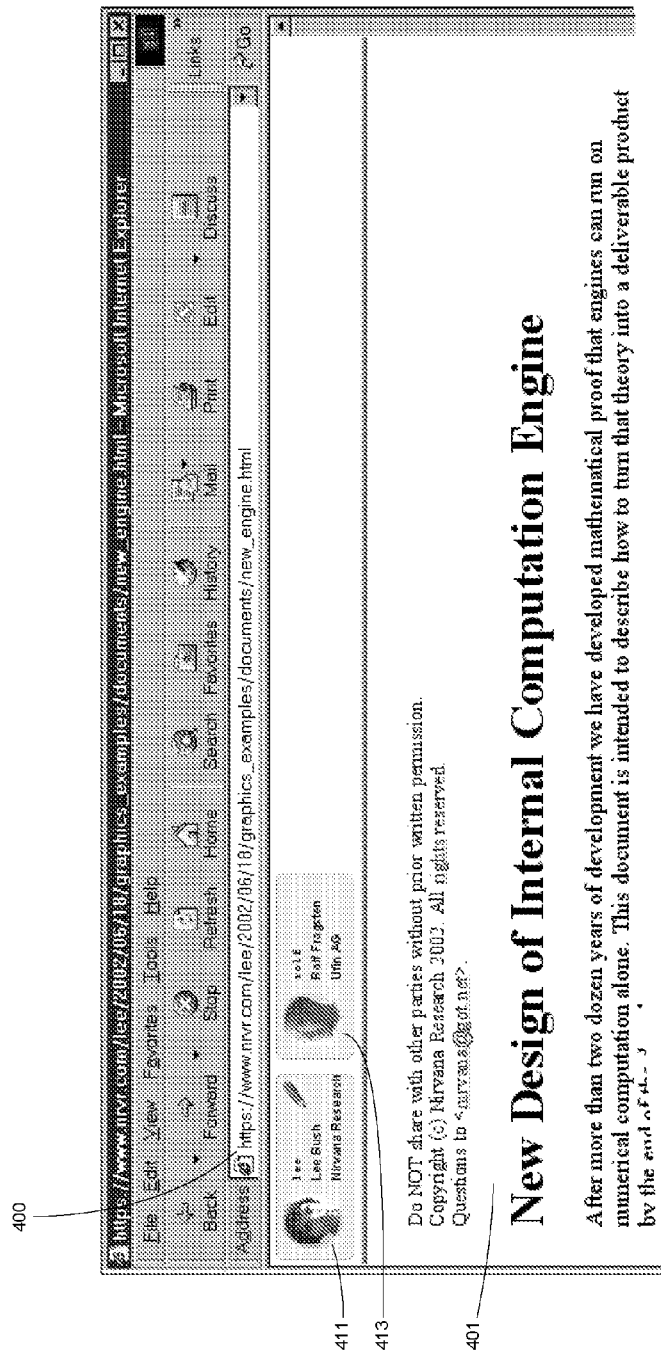
FIG. 26: Use of id card representations.

FIG. 25 shows different graphical representations for users and groups. FIG. 26 shows use of id card representations, which is in contrast to FIG. 9 using much smaller representations.

The goal of processing the photographic likenesses is that graphical representations of collections comprising users appear more evenly patterned. It is not intended to achieve perfection. It is not intended to correct extremely bad images.

Available prior art literature describes how to manipulate color saturation, brightness, contrast, and sharpness, and common software tools, such as Adobe PhotoShop may be employed.

Popular photo editing software allows such manipulation if the operator pulls a slider element in the photo editing software's graphical user interface. The intention of the present invention is to automatically apply approximate adjustments to photographic likenesses for the purpose of making displays of collections of such likenesses appear more evenly patterned.

Photo editing software products have auto-adjustment options, but those options are designed to enhance individual images, which is not the same as the present invention, which aims to make images more similar.

Adjusting image color saturation toward a predetermined target saturation level would preferably be used for reducing toward a predetermined low level.

The ultimate reduction of color saturation is conversion to grayscale, which requires less computation.

One implementation of conversion to grayscale comprises the steps of: If in RGB (the red, green, and blue color space) then setting all image elements' RGB components to the average of the weighed RGB components, (R*30+G*59+B*11)/100, else if in HSB (the hue, saturation, and brightness color space) then setting all image elements' S component to zero. Other formulae are known as well.

Advantages of grayscale include: Less distraction by colorful attire, less potential for prejudgment by skin color. If using grayscale, then colors can be used exclusively to convey meaning in the user interface of the present invention, e.g. green for write privilege granted, red for privilege denied, blue for overflow.

One implementation of adjusting image color saturation comprises the steps of: Converting RGB to HSB, adjusting S, converting HSB to RGB.

One implementation of adjusting image color saturation toward a predetermined target saturation level comprises the step of: In HSB trimming all image elements' S component if it exceeds the target saturation level. This technique produces acceptable results for reduction toward a low level.

Another implementation of adjusting image color saturation toward a predetermined target saturation level comprises the steps of: Obtaining a quotient by dividing the target saturation level by the largest possible saturation level, in HSB multiplying all image elements' S component with the quotient. This technique produces good results for reduction toward a low level.

Another possibility for adjusting image color saturation toward a predetermined target saturation level involves histogram adjustments for saturation levels, eliminating peaks, reducing average, only if above target.

One implementation of adjusting image brightness toward a predetermined target brightness level comprises the steps of: Determining the average of brightness for the complete region of an image, obtaining a quotient by dividing the target brightness level by the determined average, if in RGB then multiplying all image elements' RGB components with the quotient and trimming any excessive products, else if in HSB then multiplying all image elements' B component with the quotient and trimming any excessive products.

One implementation of adjusting image contrast toward a predetermined target contrast level comprises the steps of: Determining the arithmetic mean of brightness for the complete region of an image, determining an average deviation of brightness by averaging the absolute values of deviation of brightness from the determined arithmetic mean, obtaining a quotient by dividing the target contrast level by the determined average deviation, multiplying all image elements' deviation of brightness with the quotient and trimming any excessive results.

GUI Each User

A specifically useful configuration of the present invention is when the set of display regions simultaneously comprises the following two display regions: One display region for a graphical representation of a set of groups and users and their respective access privileges as defined by existing structured data for the resource, as well as another display region for a graphical representation of the result of transforming the set of groups and users and their respective access privileges into a corresponding set of individual users only and their respective effective access privileges.

Seeing both helps understand, e.g. if defined user Lee write, group Marketing read, and user Rolf read, the corresponding set of individual users could be user Lee write, user Hank read, user Thomas read, user Christoph read, user Rolf read.

There are at least two reasons for displaying the definition by group at the same time as displaying each individual user: (1) Manipulation would be via the defining region, e.g. adding user Rolf, or maybe obviously, removing group Marketing. (2) If a group changes, grows or shrinks, such change should correctly be reflected in the display of individual users.

Individual operators should be able to set preferences. Such operator preferences could be system wide, per resource, or per hierarchical context. Of specific interest would be preferences that balance amount of information against display space used. Because of the declared goal of achieving highest rates of correct decisions by operators in the shortest possible time and while expending their least effort it is desirable to implement quite a number of operator preferences, including but not limited to sorting by name, by group membership, by access time, by operator chosen deliberate order, by seating order, also id size, id type, relative locations of display regions, etc, whatever is necessary to make each individual operator work best and most reliably. It may be desirable to implement mechanisms that allow an administrator to preset, and also to override individual operator preferences.

GUI Drag and Drop

To enable the operator to modify access control settings for the resource, the invention should further comprise a display region for a graphical representation of at least one set of known users and groups, and the operator should be able to point to indicia for such known users and groups and drag such indicia into another display region to effect change to the structured data which defines the access control settings for the resource. To avoid display clutter, and to save display space, that display region for known users and groups unless activated by the operator, e.g. through a mouse gesture or through a key combination, should use an alternate layout that requires little space, e.g. nothing but a small indicator.

To give someone access to a resource hence has become as easy as dragging and dropping that person's photographic likeness, and if implemented with all features of the present invention then there is immediate feedback that the person effectively is allowed to access and also later then when the person indeed does access the resource.

Figure 29:
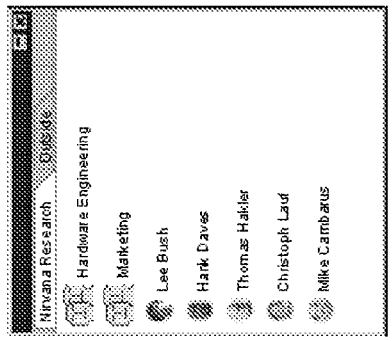
FIGS. 27 to 29: Arranging representations of known users, groups, and macros.
Figure 28:
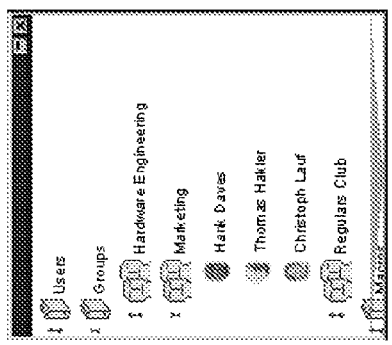
Figure 27:
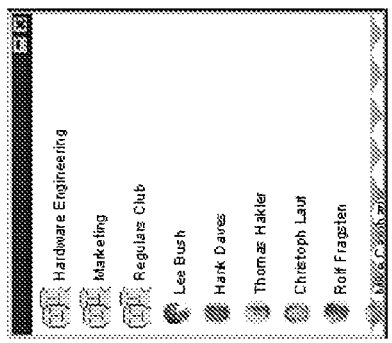

FIGS. 27, 28, 29 show different options for arranging representations of known users, groups, and macros. FIG. 27 shows a list, FIG. 28 shows a hierarchy, FIG. 29 shows custom grouping.

One set to drag from could list all known groups and users. Alternative sets to drag from could list subsets, e.g. grouped by organizational affiliation, those who have been selected recently, those found by a resource specific and operator specific kind of association that can be formulated in an algorithm, or those who are in the personal address book of the only user who has write privilege if and only if the operator is that user.

One skilled in the art can implement drag and drop using available functions of the graphical user interface object platform that is being employed.

Specific value lies in the fact that by the principles of the present invention most access control related display regions do not appear in front of, cover up, or block the view of the familiar display region for the representation of the resource itself, e.g. while editing a word processing document one would at any time be able to glance at a compact representation of its access control settings.

Specific value lies in the fact that by the principles of the present invention the access control related display regions could and should be in the same relative position, often adjoining, to the familiar display region for the representation of the resource for virtually every resource in a system.

GUI Comprehensive Log

The present invention also can provide a graphical user interface for representing access log information and access control settings for a resource, wherein at least one display region contains a graphical representation of a set of individual users in which each of the individual users is graphically represented by a display which comprises: (1) the identity of the individual user, who unless indicated otherwise has read privilege for the resource; (2) indication whether the user has write privilege for the resource; (3) the time of the most recent read access by the user to the resource; (4) the time of the most recent write access by the user to the resource; (5) indication whether the most recent write access by the user to the resource has been the most recent write access by any user to the resource; (6) indication whether the most recent read access by the user to the resource has been before the most recent write access by any user to the resource; (7) indication whether the most recent read access by the user to the resource has been since the most recent write access by any user to the resource; and (8) indication whether the user currently is without read privilege for the resource.

A specifically useful configuration is when the set of individual users consists of (1) the set of users who have any access privilege at all for the resource, and (2) the set of users who have accessed the resource in the past although they currently are without any access privilege for the resource. Ideally this user interface appears integrated with a familiar display region for a representation of the resource, e.g. with the main view in word processing software, in drawing software, or in other office or productivity software which would be used in a collaborative manner, or with the main view in Web browser software. See above for description of FIG. 9.

An implementation could use a table, one row per user, columns for items of information. A table is still a table even if there are no visible separating lines. A table is still a table even if there are no visible headers.

Data could be shown "if so" and "if any", but "if not so" and "if not any" then a blank could be shown. Blank is a representation too, if defined, if in a predefined place, relative to more descriptive, more visible items.

Entries could be sorted by time of access, by privilege, by user, by user affiliation, by a predetermined function, or in other ways.

Time of access is meant to describe time of day and which day. If there has been no read or write access yet then don't display any value in its place. In addition, other parameters, including location of access, device used for access, bandwidth of access, form of access (e.g., text, graphic, video, translations, and other forms derived from a canonical document form by translation, transformation, sampling, etc.) and the like may be logged and displayed.

More detailed information could be made available when the operator selects an entry or an item.

In logging or in log processing it would make sense to pull together read accesses by one user which are not interspersed by write accesses by anyone. That could be displayed by first, last, or with details, either indicating number of repeated reads, or listing each read.

An implementation could allow the setting of preferences that govern how accesses are put together, and how they are displayed in a compact way until or unless the operator interacts with the user interface to see more detail. Example scenarios include: The operator might want to know whether a user has read a resource an excessive number of times. E.g. if it is a paid service, or a resource intensive service. Maybe the operator by default only wants to know when user has read a resource the first time? E.g. if it has been a request to deliver a product, or to perform a task. Different applications, different preferences.

The present invention has been motivated, in part, by wanting to know who has read a document before going into a meeting.

An "indication" could be an icon, background color, foreground color, text color, or font variation.

One possible reasonable simplification can be to that a logged write access implies a read access.

An implementation could use a seating order based view instead of a table view. If well integrated with other sections of this disclosure, the operator could click on individuals to enable or disable writing or reading.

A specifically useful configuration of the present invention is when the set of display regions simultaneously comprises: (1) A familiar display region for a representation of the resource, e.g. the main view in word processing software, or the main view in Web browser software, (2) a display region for a graphical representation of the set of groups and users and their respective access privileges defined by existing structured data for the resource, i.e. for easy review and manipulation of the settings, (3) a display region representing access log information for the resource, i.e. to show who actually did or did not access the resource and when, and (4) a display region for known users and groups which remains hidden unless activated by the operator, i.e. to allow modification of access control settings for the resource by simply dragging indicia for known users and groups. See above for description of FIG. 9.

If well integrated in the surrounding operating environment, the operator could click to contact a person by sending an email, or a message, or linking to other software, e.g. to send a reminder to look at a document.

In an implementation that builds upon Apache Web server software much of the information needed for this kind of log display could be retrieved from standard Apache log files. It is possible, however, to achieve specific performance goals by implementing appropriate logging hook functions in a custom Apache module.

GUI Differentiating Every Resource

To aid the operator in reviewing and administrating a user's access in a collection of resources, e.g. in a hierarchy or in a set, the present invention can provide a graphical user interface for representing access privileges for the user for resources in the collection of resources, wherein at least one display region contains a navigable structured graphical representation of the collection of resources, e.g. a tree view or a table view, in which each one represented resource is graphically represented by a display which comprises identification of that one resource and which, by applying a predetermined algorithm, indicates the user's effective access privileges for that resource by variations in at least one appearance parameter such as (1) indicative icons, (2) color, (3) transparency, (4) height, (5) width, or (6) font parameters.

In the structured representation each one represented resource, without exception, should be selectable by the operator, regardless of any such variations in appearance. Dynamic graphical feedback for a resource selected by the operator should clearly indicate information including the identity of the selected resource, and dynamic graphical feedback for a resource approached for being selected by the operator should clearly indicate information including the identity of that resource too. The clarity achieved by such dynamic feedback should purposefully be independent of any possible lack of clarity affected by the variations in appearance.

A specifically useful configuration of the present invention is when variations in appearance comprise a reduction in height for the resource if the user is without any access privilege for the resource, and dynamic graphical feedback achieves clarity by using regular height for indicating identity.

This feature has been introduced to answer the question: Which resources can one specific user access? What is the complete answer to that question? This can be important to review e.g. an external collaborator's access to project information. Can that person access all necessary resources? Can that person access more resources than necessary? Is it easy to find out about and to switch on and off access to resources that are determined necessary or superfluous, given that person's intended status?

This feature is useful if a user is limited to access to a small number of items on a server that is full of thousands of documents.

Resources can be selected individually by the operator, e.g. by using arrow keys, or by pointer. There could be automatic zooming when hovering. A regular size representation of the selected resource could float, or the equivalent of tool tips could be used to identify a resource that has a tiny representation.

This feature is useful if accessible items are regular size, not accessible items are small, even if they are below one pixel size, because they will be zoomed when selected.

If the operator selects with arrow keys then the selection should pop up to regular size. Ideally, keys should behave almost or completely the same as in known tree views.

Dynamic graphical feedback indicates the identity of any selection made or being considered for making One example for "being considered for making" is when the pointer is above where the selection would have to be made if it were to be made. Feedback options include popping to return to regular size, faded becoming solid, or traditional highlighting options.

It is important to note that once selected a variety of functions should be made available, e.g. through menu choices, possibly a context sensitive popup menu. Functions should include reviewing and modifying access control settings for the selected resource, reviewing log information, and switching to a different view.

One aspect of what is innovative about this feature is that the operator can view and work with access privileges for another user. Previous art may provide some related functionality, but not focused on the point of view of an individual other user. This feature intends that the operator retains identity, but can readily comprehend what another user has access to.

Figure 35:
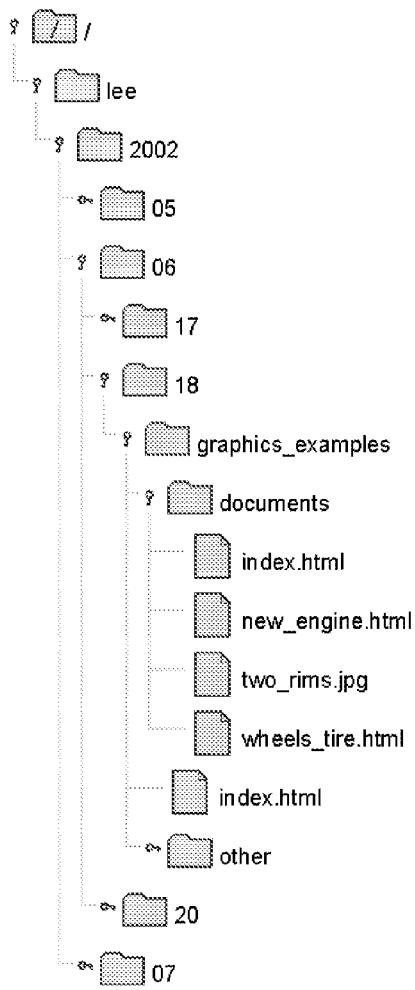

FIG. 35 shows a representation of a hierarchy of resources, a tree of directories and documents. For this example one can assume the operator is a super user and has access to all resources.

Figure 36:
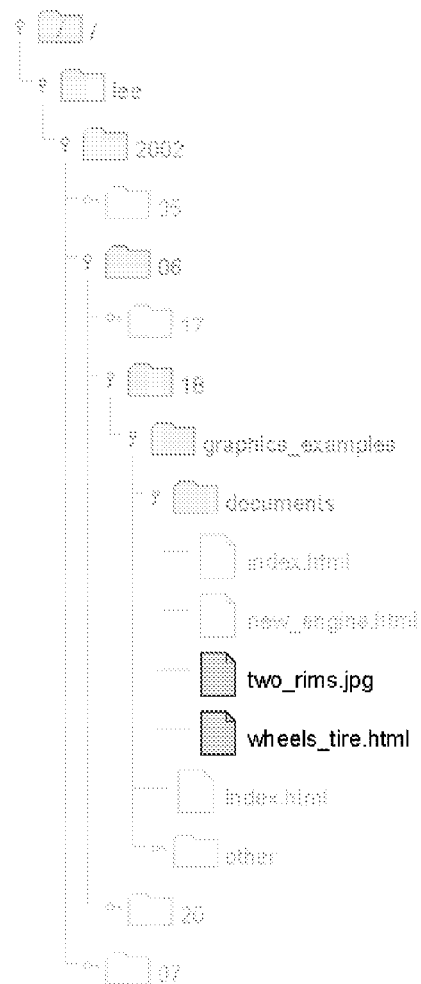

FIG. 36 shows a representation of the same hierarchy of resources, this time differentiating what documents another user has access to. Documents which the user has access to are represented in regular appearance, e.g. "wheels_tire.html", and "two_rims.jpg". Documents and directories to which the user has no access are represented faded. To aid common usage patterns, there are two levels of fading: Very faded for items to which the user simply has no access, e.g. "05", "17", "index.html", "new_engine.html", "index.html", "other", "20", and "07"; and less faded, i.e. somewhat more recognizable, for directories which are parents or ancestors of items to which the user does have access, e.g. "documents", "graphics_examples", "18", "06", "2002", "lee", and "/".

Figure 37:
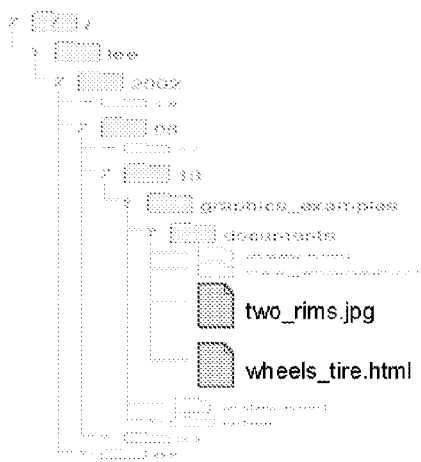

FIG. 37 is similar to FIG. 36, except that there is reduction in height for items to which the user has no access. To aid common usage patterns, there are two levels of reduction in height: Extreme reduction for items to which the user simply has no access; and less reduction, i.e. somewhat more recognizable, for directories which are parents or ancestors of items to which the user does have access.

Figure 38:
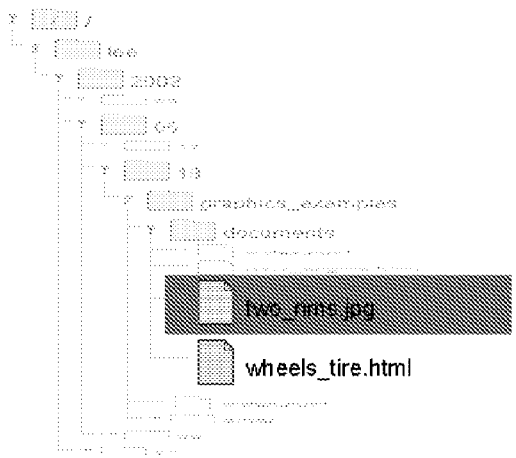

FIG. 38 shows document "two_rims.jpg" highlighted, as selected by the operator.

Figure 39:
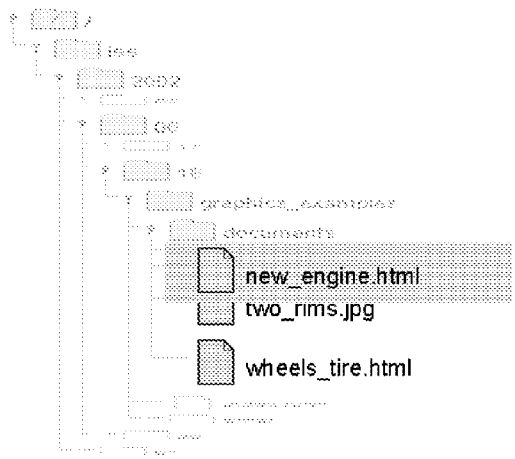

FIG. 39 shows document "new_engine.html" highlighted in a more recognizable appearance, as selected by the operator, e.g. from FIG. 38 by pressing the Up-Arrow-key.

When the operator can select a resource then there should be further user interface elements that allow invocation of functions for the selected resource, including but not only functions to review and change the access control settings for that resource. Hence, if deemed necessary, the operator should be able to limit or to expand access to resources for the user while browsing through these views.

That a resource can be selected should not limit the selection to be one resource at a time. It should be possible to make a larger selection by selecting one resource after another, possibly using platform specific standard modification keys, e.g. the Shift-key and the Ctrl-key.

This feature for hierarchies would be useful with file systems, e.g. source code, or scientific work. This feature for sets would be useful with records in a database, e.g. medical records.

This feature can be implemented to show a variety of information per resource, depending on the intended application, including whether user is allowed to access, whether and when user actually has accessed, why user is allowed to access, who else is allowed to access, or a representation of the resource being accessed. What is important is that the operator becomes aware of what the user can access.

GUI Information Overflow

Layout is important in theory and practice of the present invention. Operator comprehension, and consistency should be increased through consistent and clever layout of user interface elements. One potential problem could be circumstances when there are more items to display than would fit into predetermined display regions, e.g. when there are a large number of users who are allowed to read a document. A commonly employed technique is to use scroll bars. The potential for pervasiveness, for omnipresence, is an important part of the appeal of the present invention. Consequently, minimal use of display space is an essential virtue in practice of the present invention. That said, there are at least three problems with commonly known scroll bars: (1) Scroll bars use display space themselves. That may not be a problem for a single document window which covers most of the display device, but it becomes a problem when several small regions each would need scroll bars of their own. When scroll bars use in excess of e.g. fifty percent of available display space, then there is a problem. (2) Scroll bars can cause abrupt reformatting of contents. Once content has increased to the point that it requires scroll bars, the very appearance of scroll bars takes away some of the display region which previously had been available for contents. That can cause reformatting, i.e. contents to be laid out somewhat differently in the remaining display region. (3) Scroll bars have proven not to fit in with the visual appearance that has been achieved with implementations of the present invention. If operators pay less attention to access control settings because individual, auxiliary, user interface elements divert their attention, then those user interface elements should be considered a problem. Scroll bars are considered integral part of most user interface object platforms, and, for reasons which to explore would exceed the scope of this disclosure, there is little variation being practiced by software that employs them.

The present invention suggests, instead of employing scroll bars, to use a graphical user interface for representing a set of a variable number of items in limited display space which comprises (1) a visible region, (2) a virtual plane, and (3) a small number of overflow indicators, wherein each of the represented items is graphically represented by a predetermined display; each of the item displays is positioned in the virtual plane; the virtual plane, with the item displays in it, shows inside the visible region in such as way as one sheet of paper, with drawings on it, would show through a cutout in a larger sheet of paper in front of it; the overflow indicators are located inside the visible region; the overflow indicators are located near such edges of the visible region beyond which more of the item displays are out of sight; the number of overflow indicators is zero in case all of the item displays fit inside the visible region; a plurality of functions are implemented which change the position of the virtual plane relative to the visible region; a context dependent subset of the functions are available for selection by the operator for immediate and subsequent use; the visible region remains constant in size and shape, even when the number and locations of the overflow indicators are changing; and the overflow indicators are graphically represented by using modern features of graphics platforms, including but not limited to transparency and anti-aliasing. As one can conclude from the description, there is a smooth transition between the appearance of this user interface when all items fit and the appearance when there is overflow.

In order to visually alert the operator to overflow, it is possible to keep item displays predominantly of low color saturation, and to use overflow indicators that are of distinctively higher color saturation.

Also, the overflow indicators near an edge of the visible region could, by variations in their graphical appearance, convey some information about the number of item displays which are out of sight beyond that edge.

Represented items, obviously in the context of this disclosure, could be entities that have access privileges for a resource.

Figures 30, 31:
FIGS. 30 to 34: Overflow indicators.
Figure 34:
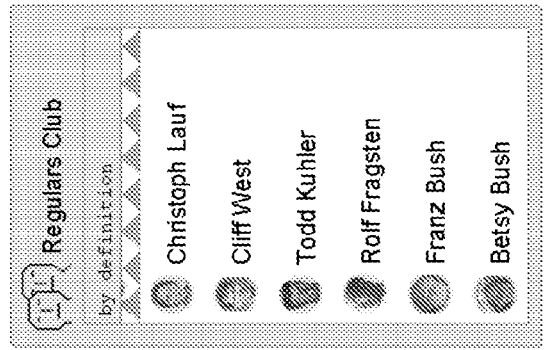
Figure 33:
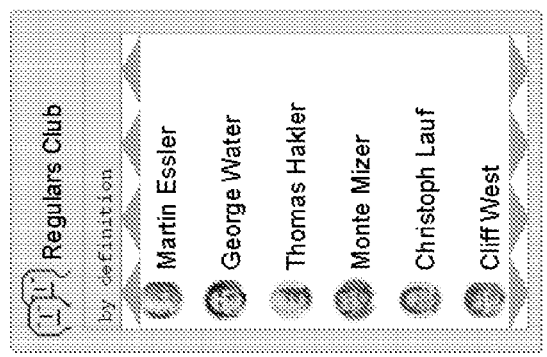
Figure 32:
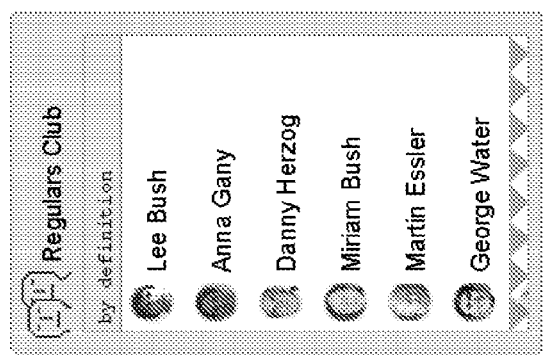

FIG. 30 shows a representation of the members of group "Regulars Club". FIG. 31 shows an alternative representation of the same group, which uses less display space. FIGS. 32, 33, 34 are similar to FIG. 30, but in less vertical space. FIG. 32 shows the same group with an overflow indicator at the bottom, FIG. 33 with overflow indicators at the top and at the bottom, FIG. 34 with an overflow indicator at the top. The overflow indicators are semitransparent blue triangles. The number of triangles equals the number of members beyond the respective edge.

A great example is when there is a large number of people who may read a document.

One improvement over scrollbars is that scrollbars take away space. Maybe most notable is that scrollbars narrow the width of text and hence can cause new calculation of line breaks or other changes to positions of objects.

One improvement over the mouse wheel icon is that the present invention indicates to the operator where additional information is to be found.

The present invention guides the eye towards where additional information will appear when scrolling. Functions to change the position, i.e. "for scrolling", can be invoked by the operator, e.g. by mouse clicking in or near overflow indicators, hovering over or near overflow indicators, or by keystrokes.

Context dependence of determining the subset of functions should practically effect that the operator cannot scroll beyond meaningful limits.

Using color saturation as user interface design element is specifically attractive or useful in applications where fitting into the visible region is common, overflow is less common, but overflow must not be overlooked. One example would be if the operator must approve of the set of users who can read a document then it would be undesirable if the operator would overlook any user who is hidden because of overflow. The present invention would alert the operator. Through distinctively different color or higher saturation it draws attention to the fact that more information must be reviewed than what is visible without scrolling.

Possible overflow indicators include: (1) Triangles, one wide for one item, two half width for two items, up to a maximum, which at least is dictated by display device resolution but should be set before that to avoid device dependent appearance; or (2) a textual representation of the number of hidden items, possibly within a bounding shape, e.g. a rectangle.

Macros

When thoroughly implementing access control for resources one will encounter the concept of change in time. While it can be interesting to explore such a topic theoretically, here this disclosure resorts to using examples. If giving a group read privilege for a document, e.g. giving group "Staff" read privilege for document "products.html", then the underlying model will permanently store the group id, e.g. "Staff", in access control settings defining structured data for the document. When at a future point in time a user requests read access then if at that time the user is a member of the group, e.g. "Staff", then access will be allowed. Newly joined members of the group, e.g. "Staff", will be allowed to read. This behavior may be expected, appropriate, and intended in many circumstances. There are other circumstances, however, when such behavior would be undesirable, and other behavior would be preferable. One example could be the summary of a meeting with another business entity, e.g. a document "proceedings.html", under the special circumstance that the meeting has been covered by a confidentiality agreement which requires individual personal physical signatures of all parties. Automatic read privilege for new members of "Staff" would violate the confidentiality agreement, assuming it improbable that anyone remembers, or bothers to keep collecting signatures, if that even were permissible at such later time.

It does not take a convoluted example. A simple policy could do. How to implement a policy that certain documents by default should only be accessible to those employees who have been a member of the organization on the day the document has been authored? An answer lies in not storing the group id, e.g. "Staff", in access control settings defining structured data for the document, but in storing each individual user id, whatever number there are. Does this mode replace or obsolete the use of groups? No. There is use both for groups in their known meaning, and for this new concept. Examples for documents that, by using groups, still should automatically become accessible to all new members of "Staff" could include: Employee health plan brochures, company tradeshow schedules, etc.

For greater efficiency in administrating access control settings, the present invention defines the concept of "macro" for use within the context of the present invention. Whatever way a macro has been defined, e.g. as constant set of user ids, or as algorithmic function, and whatever way it is being identified, e.g. by id, or by icon, the essence of a macro is that when it is used in modifying access control settings then not the id of the macro will be stored in access control settings defining structured data for the resource, but some other information, consistent with whatever it has been defined to be, e.g. the constant set of user ids, or a set of user ids resulting from evaluating the function.

For the example group "Staff" there might be an accompanying macro "Staff today", or "Staff now". The group will change in time, but where the macro has been used there the set of individual users has been defined the day, or moment it has been used.

Another useful macro would be "those who have any access privilege at all, right now, for" a specific resource, or maybe equivalent "those who are, right now, allowed to read" a specific resource.

FIG. 28 shows three main branches in a hierarchy to choose from: Users, Groups, and at the very bottom, Macros.

The theory of the present invention is equally applicable when not recognizable user ids, or group ids are being stored, but when equivalent, or similarly usable machine readable constructs are being used.

Macros not only can be used in graphical user interfaces of the present invention, but they could be used in other user interfaces for access control settings as well. E.g. a command line interface could accept a macro as parameter, instead of a group, to add its users with read privilege for a resource.

In other words, the present invention suggests a user interface for representing and manipulating access control settings for a resource, where in tradition the kinds of entities that can be defined to have and not to have various access privileges comprise users and groups, where instances of structured data comprising identifiers of such entities, i.e. user ids and group ids, are stored permanently as definitions of the access control settings, where macros can be defined to encompass sets of such entities, specifically sets of users, and where those macros can be used in user interface interactions analogously to the use of groups in those interactions, while only identifiers of the entities which constitute the macros are stored permanently in those instances of structured data, rather than identifiers of the macros themselves.

Access Dependent Contents

If the present invention enables people to control who can access what document, what will follow is a greater diversity in access control settings than in environments where access control is more difficult to manipulate. One consequence will be that hyperlinks have a much higher probability to lead a user to a document that the user is not authorized to access. Here are two examples:

(1) A researcher may publish a table of contents for all work that researcher is doing. Some items may be limited to a certain audience. Will anyone see the restricted items in the table of contents? Should there be separate tables of contents for different audiences? Should the researcher have to keep track of who may see which table of contents?

(2) A report may have an introductory paragraph that identifies at which site samples have been collected, or how much is being paid for it, by reference to the document with which it has been ordered. That order document may be limited on a need to know basis, as should be the information extracted from it.

The present invention suggests a significant improvement in dealing with these situations, by the use of markup which causes conditional omission of elements of documents, conditional on access control settings for resources, in general resources other than the document itself, resources which are identified by reference, mostly that would be resources which are referenced in the section of the document which is subject to conditional omission.

For example (1) the present invention suggests each entry in the table of contents to be shown only on condition that the person viewing the table of contents is authorized to see the document that is referred to from the entry by hyperlink.

For example (2) the present invention suggests use of markup to omit that paragraph from being shown to people who are not authorized to see the initial order document.

The present invention suggests that optional attributes can be used in a descriptive way to effect visibility for elements in documents which automatically depends on the user's access privileges for other resources.

More formally defined, the present invention suggests a system for omitting elements from documents as a function of user identity and access control settings which comprises a processing mechanism which processes documents before passing them on, a parsing mechanism in the processing mechanism which parses markup language for elements and attributes, and an access control function mechanism which is activated by the parsing mechanism when a defined access control function attribute, e.g. access:if="../internal/customerlist.html", is encountered. The attribute should provide a value which identifies a resource, e.g. ../internal/customerlist.html. The access control function mechanism should make a determination of access privileges which the user has for that resource, and then should by applying its predetermined function to the access privileges make a decision on whether to omit the element, e.g. a <li>, a <p>, or a <span>, with which the attribute is associated, e.g. to omit if the user is not allowed to read document ../internal/customerlist.html. That decision should be implemented by the processing mechanism, coordinately acting together with the other mechanisms.

If such a system is implemented for server side processing, then processing should not modify the original documents. Any omissions are made instead in processed versions of the documents, i.e. in the documents that are being transferred to clients. A document that is stored on the server can appear at different levels of completeness to different users, depending on their respective access privileges for other resources, i.e. for the resources identified by the values of access control function attributes.

An implementation for server side processing by an Apache module, custom programmed at the lowest level, e.g. in C, or at a higher level, e.g. in Java, should use the same or equivalent mechanisms to communicate with the control server as have been described for making the decision for actual access to resources. The module should give the control server (1) a user id, (2) a URI path, and (3) an access method, which most probably would be READ, the control server should return its determination of whether access is authorized, and then the module should apply its predetermined function to make a decision on whether to omit.

In the context of this section of this disclosure, "the user" obviously is an "accessing user", but the mechanism described herein could be used to process for any user, e.g. to review what another user would see.

It is not a requirement for a reference to be both in the section to be considered for omission and to be used in the condition for omission. It is expected that most use of this feature will be with the same reference both in the section considered for omission and in the condition, but it is not required.

It would be a very useful feature for document editing software to have support built in to extract one or several references to resources from a selected section of a document and to automatically copy those references into a conditional construct for the present invention that covers that section of the document.

It might be considered useful to implement support for an access control function attribute that during processing automatically extracts references from the contents of its element.

One disadvantage, however, would be higher computational effort at each access. Another disadvantage would be the need to understand potential contents of elements.

Additional Elements

Graphical user interfaces could directly communicate with the control server. The control server should be implemented not only to interface with the Web server, but also with graphical user interface components that implement the present invention. Coincidentally, the communication between the control server and GUI components on a client machine may be routed through the Web server, which can give the benefits of using an outside connection that is open already, and that might be encrypted already.

The control server may greatly benefit from caching in memory. The control server may greatly benefit from caching more than one representation of the same data, for different kinds of queries which may come from GUI components.

The control server may be able to communicate various kinds of information about access control. For example, a program might want to perform auditing of access control settings. The control server's two originally intended partners for communication, however, are the Web server and graphical user interface components. The purpose of the graphical user interface components is to review and to modify access control settings.

One aspect of improving ease of use it to always have access control at hand, whenever working with resources or documents. If the client machine runs a Web browser, then one way to achieve apparent ubiquity is to put access control GUI components into a frame next to the documents being viewed. If the client machine runs an application, then omnipresence can be achieved by putting access control GUI components into larger displays together with browser views, and as needed optionally with trees views, or other views. In either scenario, events should be sent between individual components, using techniques appropriate in the GUI component architecture which is in use, to ensure the access control display matches the current document display.

In a well-designed user interface that implements the present invention it should be possible for the operator to follow a circle, or a mesh of navigation. From a resource one could explore to a user, from the user to other resources, from a resource to other resources, groups, logs, hierarchies, references, etc. If something is related, then it should be possible to navigate to it. All user interface components should be synchronized appropriately.

Specific points of view which should be provided by a good implementation of the present invention include: (1) Given a user, a resource, and an access method, is it authorized or not? (2) Given a resource, which users are authorized to access with which methods? (3) Given a user, which resources is the user authorized to access with which methods?

One can expect implementations where a user is replaced by an abstract concept, e.g. something like a role. The theory and principles of the present invention still would be applicable.

Photographic likenesses might be replaced by drawings, or by other kinds of artifacts. The theory and principles of the present invention still would be applicable.

This disclosure is not specific about who has rights to set rights. For easier understanding when reading this disclosure one may want to assume the operator is a super user. Another possible assumption is that the operator has the right to set rights on resources which the operator self owns, on documents which the operator self has authored. In implementation various algorithms may be used.

Instead of READ and WRITE, HTTP uses GET and PUT. Other names may be used for equivalent concepts.

One example why other than "allow" an implementation might want to support "deny" is the announcement of a surprise birthday party, which should be seen by everyone except the person to be surprised, hence e.g. "allow Department" and "deny Bob".

Multidimensional spaces may also be implemented in the present invention, to accommodate higher-dimensional user interface models and more complex access control models. Such user interface models, including cubic three dimensional web browsers, and temporally defined interfaces are known in the art, and any reference to dimensions or spaces herein should be understood to include such multidimensional spaces. In sensitive environments, for example, access to a given resource may be permitted only at certain times. In a records-retention system, for example, certain records may be encrypted with a key that requires access to a verified source of time information. After a predetermined time, e.g. seven years after resource creation or storage, the decryption would no longer function, effectively destroying the document by preventing access to the contents. In a similar way, documents which should not be available until a particular time may be encrypted to prevent access until the designated time. (Some refer to these complimentary functions of the system as "disappearing ink" and "appearing ink" functions.) Similarly, employees of a bank have access to the contents of the vault only at times designated by the time lock on the vault.

Other information may be incorporated into the system of the present invention. For instance, multipart authentication, such as with biometric indicators, hardware keys, and the like may be directly interfaced to the methods presented herein. In this way, control of access to physical resources (rooms, facilities, etc.) may be managed using the graphical interface of the present invention.

Using the present invention, it is feasible to design systems that feel like prior art messaging systems to users, but that actually store all messages on servers that use the present invention. In order to achieve high levels of security, all writing and reading will be done to and from a server that is secured by the present invention, using prior art messaging systems only to carry concise notifications that new information is waiting for an addressee to read.

In such a communication system, writing of messages is done when logged in, e.g. in a secure applet in a secure page in a browser. Reading can be done with traditional secure clients reading from the secure server. Messages are only available from the secure server with secure log in. Notifications over prior art messaging systems may be used to deliver a link to the secure message as resource.

In such a communication system, optional interfaces to messaging systems of the prior art may allow sending and receiving of email, instant messages, and other messages. Such optionally supported sending and receiving of legacy messages to and from individuals without full access to the communication system, however, in most cases would result in lower security.

Using the present invention, it is feasible to design systems that use proxy technology to retrofit the present invention in front of existing servers. Specifically, Apache configured as proxy server and with the present invention can provide access control for existing resources.

While the invention has been described in its preferred embodiments, it is to be understood that the words which have been used are words of description rather than of limitation and that changes may be made within the purview of the appended claims without departing from the true scope and spirit of the invention in its broader aspects. Rather, various modifications may be made in the details within the scope and range of equivalents of the claims and without departing from the spirit of the invention. The inventor further requires that the scope accorded his claims be in accordance with the broadest possible construction available under the law as it exists on the date of filing hereof (and of the application from which this application obtains priority), and that no narrowing of the scope of the appended claims be allowed due to subsequent changes in the law, as such a narrowing would constitute an ex post facto adjudication, and a taking without due process or just compensation.

I claim:

1. A computing device for facilitating user manipulation of access control settings for a visual digital document, the computing device comprising:
   a processor; and
   a memory for storing computer executable instructions that, when executed by the processor, cause the processor to perform the steps of:
   displaying a plurality of display regions on a display of the computing device for graphical representations of the persistent access control settings for at least one visual digital document;
   displaying a resource region for allowing an operator to identify and select a predetermined visual digital document;
   displaying a content region for normal size visual representation of the content of the predetermined visual digital document;
   displaying an access control settings region enabling the operator to assign access privileges to a user or a group of users, wherein access privileges include at least read and write privileges;
   displaying an effective access control settings region including identifications of a plurality of users and effective access privileges associated with the plurality of users;
   displaying a log information region including access information for at least one recent access to the predetermined visual digital document, wherein the access information includes at least a user identification and time of the most recent access; and
   wherein the resource region, the content region, and the effective access control settings region are concurrently visible, concurrently operable, and appear to the operator as in an integrated graphical user interface.

2. The computing device according to claim 1, wherein the processor further performs a lookup operation to retrieve an image of a user for displaying within the access control settings region and the effective access control settings region.

3. The computing device according to claim 2, wherein the user is graphically represented by a display element comprising at least in part, a digital photograph, processed by a method selected from a group consisting of:
   adjusting image color saturation toward a predetermined target saturation level;
   converting to grayscale;
   adjusting image brightness toward a predetermined target brightness level;
   adjusting image contrast toward a predetermined target contrast level;
   adjusting image sharpness toward a predetermined target sharpness level; and
   masking with a shape.

4. The computing device according to claim 1, wherein the plurality of display regions includes a first display region for a graphical representation of at least one set of known users, wherein the operator can designate indicia for known users and visually associate the designated indicia with a second display region to change structured data which defines the access control settings for the predetermined visual digital document.

5. The computing device according to claim 4, wherein the first display region further comprises graphical representation of at least one set of access control settings macros allowing the operator to designate indicia for macros and visually associate the designated indicia with the second display region to change the structured data which defines the access control settings for the predetermined visual digital document.

6. A method for facilitating user manipulation of access control setting for a visual digital document, the method comprising:
   displaying a plurality of display regions on a display of a computing device for graphical representations of the persistent access control settings for at least one visual digital document;
   displaying a resource region for allowing an operator to identify and select a predetermined visual digital document;
   displaying a content region for normal size visual representation of the content of the predetermined visual digital document;
   displaying an access control settings region enabling the operator to assign access privileges to a user or a group of users, wherein access privileges include at least read and write privileges;
   displaying an effective access control settings region including identifications of a plurality of users and effective access privileges associated with the plurality of users;
   displaying a log information region including access information for at least one recent access to the predetermined visual digital document, wherein the access information includes at least a user identification and time of the most recent access; and
   wherein the resource region, the content region, and the effective access control settings region are concurrently visible, concurrently operable, and appear to the operator as in an integrated graphical user interface.

7. The method according to claim 6 further including a lookup operation for retrieving an image of a user for displaying within the access control settings region and the effective access control settings region.

8. The method according to claim 7, wherein the user is graphically represented by a display element comprising at least in part, a digital photograph, processed by a method selected from a group consisting of:
   adjusting image color saturation toward a predetermined target saturation level;
   converting to grayscale;
   adjusting image brightness toward a predetermined target brightness level;
   adjusting image contrast toward a predetermined target contrast level;
   adjusting image sharpness toward a predetermined target sharpness level; and
   masking with a shape.

9. The method according to claim 6, wherein the plurality of display regions includes a first display region for a graphical representation of at least one set of known users, wherein the operator can designate indicia for known users and visually associate the designated indicia with a second display region to change structured data which defines the access control settings for the predetermined visual digital document.

10. The method according to claim 9, wherein the first display region further comprises graphical representation of at least one set of access control settings macros allowing the operator to designate indicia for macros and visually associate the designated indicia with the second display region to change the structured data which defines the access control settings for the predetermined visual digital document.

11. A computer program product stored on a non-transitory computer readable medium that, when executed by a computing device, causes the computing device to perform operations including:
- displaying a plurality of display regions on a display of the computing device for graphical representations of the persistent access control settings for at least one visual digital document;
- displaying a resource region for allowing an operator to identify and select a predetermined visual digital document;
- displaying a content region for normal size visual representation of the content of the predetermined visual digital document;
- displaying an access control settings region enabling the operator to assign access privileges to a user or a group of users, wherein access privileges include at least read and write privileges;
- displaying an effective access control settings region including identifications of a plurality of users and effective access privileges associated with the plurality of users;
- displaying a log information region including access information for at least one recent access to the predetermined visual digital document, wherein the access information includes at least a user identification and time of the most recent access; and wherein the resource region, the content region, and the effective access control settings region are concurrently visible, concurrently operable, and appear to the operator as in an integrated graphical user interface.

12. The computer program product according to claim 11 further including computer executable instructions for a lookup operation to retrieve an image of a user for displaying within the access control settings region and the effective access control settings region.

13. The computer program product according to claim 12, wherein the user is graphically represented by a display element comprising at least in part, a digital photograph, processed by a method selected from a group consisting of:
- adjusting image color saturation toward a predetermined target saturation level;
- converting to grayscale;
- adjusting image brightness toward a predetermined target brightness level;
- adjusting image contrast toward a predetermined target contrast level;
- adjusting image sharpness toward a predetermined target sharpness level; and
- masking with a shape.

14. The computer program product according to claim 11, wherein the plurality of display regions includes a first display region for a graphical representation of at least one set of known users, wherein the operator can designate indicia for known users and visually associate the designated indicia with a second display region to change structured data which defines the access control settings for the predetermined visual digital document.

15. The computer program product according to claim 14, wherein the first display region further comprises graphical representation of at least one set of access control settings macros allowing the operator to designate indicia for macros and visually associate the designated indicia with the second display region to change the structured data which defines the access control settings for the predetermined visual digital document.

* * * * *